United States Patent
Jensen et al.

(10) Patent No.: US 12,448,952 B2
(45) Date of Patent: Oct. 21, 2025

(54) SYSTEM AND METHOD FOR REPAIRING LEADING EDGE DAMAGE ON A WIND TURBINE BLADE

(71) Applicant: BladeRobots A/S, Skanderborg (DK)

(72) Inventors: Ivar J. B. K. Jensen, Hornslet (DK); Christian Skov, Videbæk (DK); Claus Engholm Nielsen, Ringkøbing (DK); Rasmus Sole Nørgaard, Skanderborg (DK); Aksel Petersen, Ringkøbing (DK)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

(21) Appl. No.: 18/576,788

(22) PCT Filed: Jun. 24, 2022

(86) PCT No.: PCT/DK2022/050145
§ 371 (c)(1),
(2) Date: Jan. 5, 2024

(87) PCT Pub. No.: WO2023/280360
PCT Pub. Date: Jan. 12, 2023

(65) Prior Publication Data
US 2024/0309854 A1    Sep. 19, 2024

(30) Foreign Application Priority Data
Jul. 9, 2021  (DK) ............................ PA 2021 70370

(51) Int. Cl.
*B64D 1/22*    (2006.01)
*B29C 73/02*    (2006.01)
(Continued)

(52) U.S. Cl.
CPC ............... *F03D 80/50* (2016.05); *B64D 1/22* (2013.01); *B64U 10/16* (2023.01); *B64U 80/70* (2023.01);
(Continued)

(58) Field of Classification Search
CPC ........... B64U 70/92; B64D 1/22; F03D 80/50; B62D 57/024
See application file for complete search history.

(56) References Cited

U.S. PATENT DOCUMENTS 8,851,211 B2 * 10/2014 Schlee .................... F03D 80/50
280/412
9,505,493 B2 * 11/2016 Borko .................... B64U 10/10
(Continued)

FOREIGN PATENT DOCUMENTS

DE    112017006863 T5 * 10/2019    ............. B64C 39/02
ES    2346617 B1 * 10/2011
(Continued)

OTHER PUBLICATIONS

Danish Patent and Trademark Office, technical examination issued in corresponding DK Application No. PA 2021 70370, dated Jan. 7, 2022.
(Continued)

*Primary Examiner* — Jacob J Cigna
(74) *Attorney, Agent, or Firm* — Wood Herron & Evans LLP

(57) ABSTRACT

A repair device and method for repairing damage around the leading edge of a wind turbine blade (20) are provided. The repair device includes a robotic maintenance device (40) and an unmanned aerial vehicle (UAV) (62) that can move the maintenance device (40) between a storage position and an operation position, the former being mounted on a blade (20) of the wind turbine (10). The UAV (62) hovers and remains
(Continued)

connected to the maintenance device (40) during operations at the blade (20) to minimize a total operational downtime needed to conduct the repair actions. The UAV (62) is secured to the maintenance device (40) by at least one support line (68) that carries the weight load of the maintenance device (40) and at least two control lines (72) that prevent undesired rotations of the maintenance device (40), thereby improving precision and accuracy of UAV-driven movements of the maintenance device (40). A transport container (24) may also be provided to define the storage position, the transport container (24) including an elongated slot (70) for guiding movement of the lines (68, 72) and the maintenance device (40) during movements into and out of a storage space within the container (24).

18 Claims, 18 Drawing Sheets

(51) Int. Cl.
  B64U 10/16 (2023.01)
  B64U 80/70 (2023.01)
  F03D 1/06 (2006.01)
  F03D 80/50 (2016.01)
  B64U 80/50 (2023.01)
  B64U 101/26 (2023.01)
  B64U 101/67 (2023.01)

(52) U.S. Cl.
  CPC ............ *F03D 1/0688* (2023.08); *B29C 73/02* (2013.01); *B64U 80/50* (2023.01); *B64U 2101/26* (2023.01); *B64U 2101/67* (2023.01); *F05B 2230/80* (2013.01); *F05B 2230/90* (2013.01); *F05B 2240/303* (2020.08); *Y02E 10/72* (2013.01)

(56) References Cited

U.S. PATENT DOCUMENTS

| | | | | |
|---|---|---|---|---|
| 10,647,508 | B2 * | 5/2020 | Eck | ........................ B64F 1/368 |
| 11,447,245 | B2 * | 9/2022 | Neubecker | .............. E05F 15/70 |
| 11,630,459 | B2 * | 4/2023 | Georgeson | ................ B64F 5/40 |
| | | | | 701/3 |
| 11,981,433 | B2 * | 5/2024 | Schutz | ................... G05D 1/104 |
| 2015/0266575 | A1 * | 9/2015 | Borko | .................... B64U 10/10 |
| | | | | 244/17.23 |
| 2019/0338759 | A1 * | 11/2019 | Badger | .................... B29C 73/02 |
| 2020/0116128 | A1 * | 4/2020 | Pedersen | .............. F03D 7/0296 |
| 2020/0201332 | A1 * | 6/2020 | Pedersen | ............... A01M 29/16 |
| 2021/0024333 | A1 | 1/2021 | Pedersen et al. | |
| 2021/0095642 | A1 | 4/2021 | Cieslak | |
| 2021/0107036 | A1 | 4/2021 | Hamamura et al. | |

FOREIGN PATENT DOCUMENTS

| | | |
|---|---|---|
| KR | 101764535 B1 | 8/2017 |
| WO | 2017110743 A1 | 6/2017 |
| WO | 2021113331 A1 | 6/2021 |
| WO | 2021121522 A1 | 6/2021 |
| WO | 2021121523 A1 | 6/2021 |
| WO | WO-2022091882 A1 * | 5/2022 ............ B25J 11/008 |

OTHER PUBLICATIONS

International Searching Authority, International Search Report and Written Opinion issued in corresponding PCT Application No. PCT/DK2022/050145, dated Jun. 24, 2022.

* cited by examiner

SYSTEM AND METHOD FOR REPAIRING LEADING EDGE DAMAGE ON A WIND TURBINE BLADE

TECHNICAL FIELD

This application relates generally to wind turbines, and more particularly relates to a robotic device and associated method for repairing damage along the leading edge of a wind turbine blade without necessitating removal of the blade from the tower of the wind turbine and without necessitating manual repairs by rope access technicians.

BACKGROUND

Wind turbines are used to produce electrical energy using a renewable resource and without combusting a fossil fuel. Generally, a wind turbine converts kinetic energy from the wind into electrical power. A conventional wind turbine installation includes a foundation, a tower supported by the foundation, and an energy generating unit positioned atop of the tower. The energy generating unit typically includes one or more nacelles to house several mechanical and electrical components, such as a generator, gearbox, and main bearing, and the wind turbine also includes a rotor operatively coupled to the components in the nacelle through a main shaft extending from the nacelle. Single rotor wind turbines and multi-rotor wind turbines (which may have multiple nacelles) are known, but for the sake of efficiency, the following description refers primarily to single rotor designs. The rotor, in turn, includes a central hub and a plurality of blades extending radially therefrom and configured to interact with the wind to cause rotation of the rotor. The rotor is supported on the main shaft, which is either directly or indirectly operatively coupled with the generator which is housed inside the nacelle. Consequently, as wind forces the blades to rotate, electrical energy is produced by the generator. Wind power has seen significant growth over the last few decades, with many wind turbine installations being located both on land and offshore.

As noted above, blades interact with the wind to generate mechanical rotation of the rotor, which can then be converted into electrical energy. A wind turbine blade is a complex structure that must be constructed to withstand long-term service in an abusive environment, while also maximizing lift and minimizing drag forces. The blades move at varying speeds through the ambient environment surrounding the wind turbine, but often this movement is at high speed. Consequently, the blades will typically experience erosion and damage over time in operation as a result of friction from the air as well as potential impacts from rain, particulate matter, debris, or other items in the air, especially along the leading edge that is configured to face the direction of movement through the wind. The erosion or damage along the leading edge of the blade adversely affects the aerodynamic qualities of the blade over time, resulting in lower power production for given incoming wind speeds. Such erosion and damage on the blades can be corrected by routine maintenance and repair procedures.

The blades are typically formed from a shell of layered fiber composite, aluminum, or similar material with an outer skin defined by a series of layers of coatings (polymeric elastomers, paint, etc.) surrounding and covering an outer surface of the shell. The shell encloses internal components of the blade and isolates them from the environment, including shear webs and spar caps, for example. The outer skin may be defined by several different layers of material, including at least an outermost topcoat, a second layer underneath the outermost topcoat, and a third layer underneath the second layer. Other layers are typically present underneath the third layer as well, including base materials typically made from fibre composites and the like. Damage to the blade outer skin can be categorized into several different levels of severity based on which layer the damage extends to, e.g., an erosion to the third layer would be a "category 2" level of severity, which would be higher than a cut to the second layer, which would be a "category 1" level of severity. For low levels of damage or erosion, such damage can be repaired by depositing a coating onto the area to fill in the damage and restore the blade to the original condition along the leading edge thereof. One such repair by depositing material can be reviewed in PCT International Patent Publication No. WO2018/113875, owned by the original Applicant of the present application.

Although the '875 Publication referenced above provides one automated device for maintenance and repair, these types of repairs of the wind turbine blades have typically been conducted in three other manners conventionally. First, the blade can be disassembled from the remainder of the wind turbine and lowered to the ground for the repair to be completed. Such a repair process is time-consuming and costly as a result of needing to disassemble, move, and reassemble the blade relative to the top of the tower. Second, a human operator with rope access can rappel along the wind turbine blade while still attached to the rotor hub to evaluate and make repairs as needed to the blade. Once again, such a repair process is time-consuming and costly because of the need for experienced rope access technicians and the time needed to effect the repairs manually. Third, a repair action can be taken by an operator on a platform hoisted into position adjacent the blade on the wind turbine, either extending from the nacelle or hub of the wind turbine or extending from a cherry picker or boom-style lift. In all conventional methods, the wind turbine must be stopped and locked for the time period of repair, and as such, significant power production losses are experienced by wind turbine operators for these necessary maintenance and repair actions. This may lead some operators to delay or procrastinate in making such repairs, which can lead to more significant structural damage and even longer delays when more thorough repairs are necessary on the wind turbine blade.

In recent years, a desire has emerged to allow for some more automated maintenance of wind turbine blades, to thereby improve the speed and/or precision of such a process. However, conventional automated maintenance devices are not always designed for reliable use on a wind turbine blade still connected to the rotor and hub of a wind turbine, and such systems are very slow in operation. Moreover, such automated maintenance devices have proven to be exceedingly difficult to assemble on and/or transport up to the wind turbine blade for such automated repair and maintenance actions. As a result, previously-developed automated options have not been widely adopted, as manual repair by rope access technicians has continued to be quicker and more efficient in many circumstances. Further improvements for maintenance and repair systems are therefore desired.

SUMMARY

To these and other ends, embodiments of the invention are directed to a method for repairing damage around a leading edge of a wind turbine blade on a wind turbine. In this regard, the method includes a preliminary step of operating the wind turbine to move one of the wind turbine blades to a generally horizontal orientation, and then pitching the blade in the generally horizontal orientation such that the leading edge of the blade is oriented to face vertically upward. The method also includes providing a robotic maintenance device and an unmanned aerial vehicle (UAV). The robotic maintenance device is secured to the UAV with at least one support line extending therebetween. The UAV moves the robotic maintenance device from a storage position to an operation position, the latter of which includes the maintenance device being mounted on the wind turbine blade proximate the leading edge. The maintenance device then performs repair actions as it moves along a length of the wind turbine blade. The UAV remains connected with the maintenance device by the at least one support line during the performing of repair actions. The method further includes moving the maintenance device with the UAV off of the wind turbine blade following the repair actions and returning the maintenance device back to the storage position. The use of the UAV to move the robotic maintenance device and the hovering of the UAV on-site during the repairs on the blade allows for a semi-autonomous repair to be done with as little wind turbine operational downtime as possible, as the turbine can be stopped just before the UAV is to deliver the robotic maintenance device onto the blade and then be restarted as soon as the UAV moves the maintenance device out of range of the blade movement. With no requirement for a fixed interface to be provided/built on the blade for conducting the maintenance actions and repairs, and no need for use of rope access technicians, the repair method of this embodiment achieves several technical advantages over known automated and semi-automated designs.

Several embodiments are now described in conjunction with the method(s) of this invention, and it will be understood that each embodiment can stand on its own and/or be combined in any combination with the other method features/steps in the following embodiments.

In one embodiment, the method also includes providing a transport container that contains the robotic maintenance device and the UAV during transport and before use at the wind turbine. The storage position is defined within the transport container such that the UAV moves the maintenance device into and out of the transport container when moving the robotic maintenance device between the operation position and the storage position. The transport container can further include features that help control these movements of the maintenance device to facilitate operation by an operator remote controlling the UAV.

In another embodiment, the step of performing repair actions with the robotic maintenance device includes optionally abrading an exterior surface of the wind turbine blade around the damage using a sander located on the robotic maintenance device. The abrading or sanding prepares the exterior surface for the repair actions. The maintenance device then applies a coating material over the exterior surface of the blade at a position proximate the leading edge such that the coating material fills in and covers up and damage.

In yet another embodiment, the at least one support line is secured to the robotic maintenance device in a central position that is proximate to a center of gravity of the maintenance device. The method includes further securing the UAV to a front end and a rear end of the maintenance device using at least two control lines which are configured to control rotations of the maintenance device about a vertical axis and prevent undesirable and uncontrolled rotations of this type. Advantageously, the use of the support line(s) and the control lines allows for precise positioning and orientation control of the maintenance device when being moved by the UAV, which is desirable when mounting the maintenance device in the correct position on the wind turbine blade, for example.

In a further embodiment, the at least one support line remains connected between the UAV and the maintenance device during performance of the repair actions with the maintenance device on the wind turbine blade. The at least two control lines may be optionally disengaged prior to performance of repair actions. By keeping the at least one support line connected, the UAV is in position and immediately ready to remove the maintenance device when repair actions are completed, and no permanent structure thus needs to be added to the wind turbine blade to conduct the repairs.

In another embodiment, at least one of the support lines is individually load-rated (including a safety factor) to support more than a full weight of the maintenance device, such that any one of the support lines can carry the maintenance device when lifted and moved by the UAV. It will be understood that the control lines may also be similarly load-rated, although such is not required.

In still another embodiment, the method also includes extending the at least one support line after mounting the robotic maintenance device on the wind turbine blade, thereby to remove a full loading tension force on the support line. The UAV may then be hovered within a maximum range from the maintenance device as defined by a length of the at least one support line when extended. As noted above, the hovering continues during performance of repair actions with the maintenance device.

In a further embodiment, the at least one support line secures the robotic maintenance device at a first spacing below the UAV during movement from the storage position to the operation position. The method further includes moving the UAV away from the robotic maintenance device to a second spacing larger than the first spacing before the maintenance device performs repair actions on the blade. After the repair actions are performed, the support line may be optionally retracted to thereby move the UAV towards the maintenance device back to the first spacing before using the UAV to lift the maintenance device off of the wind turbine blade. The retraction is not required in all embodiments because the high level of precise control and position accuracy assured by the smaller first spacing is not as important when moving the maintenance device to the storage position (instead of mounting on the blade). In one particular example of this embodiment, the second spacing is more than 10 times the first spacing such that continued hovering operation of the UAV does not affect the performance of repair actions on the wind turbine blade.

In embodiments with the transport container, the container defines an enclosed storage space including a rear door opening at one longitudinal end thereof and a roof at a top end thereof. The roof includes at least one elongated slot extending longitudinally from the rear door opening. The method further includes guiding UAV-driven movement of the robotic maintenance device during insertion into and removal from the transport container by sliding the at least one support line along the at least one elongated slot. Such sliding movement prevents undesired rotational movements of the maintenance device within the storage space, e.g., rotations that could cause impacts with the sidewalls of the container.

In one embodiment, the transport container defines a longitudinal length L1 and the elongated slot defines a longitudinal length L2, with L1 being greater than L2. In this regard, at least a portion of space within the transport container does not receive the maintenance device, thereby providing a safe location away from the maintenance device for an operator controlling the UAV while standing within the transport container. The repair method thus allows an operator to remote control the UAV during these steps of movement of the maintenance device while remaining fully safe from both the UAV and from the large robotic maintenance device.

In further embodiments, additional elongated slots may be provided in the roof of the transport container, with each of the elongated slots configured to receive at least one of the support or control lines for sliding, guided movement as the robotic maintenance device is moved into or out of the container. Alternatively, in embodiments with only one elongated slot, each of the support and control lines is slid into and along the one elongated slot, which advantageously maintains the alignment of the maintenance device with the longitudinal length of the container during such UAV-driven movements.

In another embodiment, the method includes parking the UAV on top of the transport container during the securing of the robotic maintenance device to the UAV with the at least one support line. Such securing can be done by running the support line through the opening defined by the elongated slot, for example.

In a further embodiment, the at least one elongated slot is closed when not in use with a closure mechanism. The closure of the slot seals the enclosed storage space from an external environment.

In yet another embodiment, the UAV is stored in a disassembled state within the transport container. The method can also include assembling the UAV on site at the wind turbine before securing the robotic maintenance device to the UAV.

In an embodiment, the method includes mounting a power supply such as a battery pack for the UAV on the robotic maintenance device. Operating power is transmitted using a cable associated with the at least one support line from the power supply to the UAV whenever the UAV is secured to the robotic maintenance device. This advantageously reduces a total load carried by the UAV when the maintenance device is mounted on and performing repair actions on the wind turbine blade, thereby increasing the total endurance and operational time for the UAV in this repair method.

Embodiments of the present invention are also directed to a repair system for repairing damage around a leading edge of a wind turbine blade. The repair system includes a robotic maintenance device configured to move along a longitudinal length of the wind turbine blade, to optionally abrade an exterior surface of the wind turbine blade around the damage with a sander, and to apply a coating material over the exterior surface of the wind turbine blade to perform repair actions by filling in and covering up any damage around the leading edge of the wind turbine blade. The repair system also includes an unmanned aerial vehicle (UAV) including at least one support line that is removably secured to the robotic maintenance device to allow the UAV to move the robotic maintenance device. The UAV also includes at least two control lines that are secured to different portions of the robotic maintenance device to control rotations of the robotic maintenance device about a vertical axis when moving the robotic maintenance device between a storage position and an operation position mounted on the wind turbine blade.

In one embodiment, the repair system also includes a transport container sized to contain the robotic maintenance device and the UAV during transport and delivery to the wind turbine. The storage position is then defined to be within the transport container.

In another embodiment, the support line is secured to the robotic maintenance device in a central portion proximate a center of gravity of the robotic maintenance device. The control lines are secured to a front end and a rear end of the robotic maintenance device on opposite sides of the central portion.

In a further embodiment, the control lines are optionally disengaged from the robotic maintenance device prior to performance of repair actions. The support line is extendible between securements with the UAV and with the robotic maintenance device, such that the UAV can move between a first spacing above the robotic maintenance device during movement between the storage position and the operation position, to a second spacing larger than the first spacing during performance of repair actions at the wind turbine blade.

In yet another embodiment, each of the support lines and optionally each of the control lines is individually load-rated to support more than a full weight of the robotic maintenance device, such that any one of the support lines can carry the robotic maintenance device when lifted and moved by the UAV.

In another embodiment, the repair system includes a power supply for the UAV, the power supply being mounted on the robotic maintenance device. A cable is then associated with the at least one support line, the cable configured to transmit operating power from the power supply on the robotic maintenance device to the UAV whenever the UAV is secured to the robotic maintenance device. As described herein, such an arrangement reduces a total load to be carried by the UAV when the robotic maintenance device is mounted on the wind turbine blade.

In a further embodiment, the transport container includes an enclosed storage space and at least one elongated slot. The enclosed storage space includes a rear door opening at one longitudinal end thereof and a roof at a top end thereof. The elongated slot extends longitudinally from the rear door opening, with the at least one elongated slot sized to receive the at least one support line and/or the at least two control lines such that UAV-driven movement of the robotic maintenance device is guided during movement into and from the transport container. The transport container defines a longitudinal length L1, the at least one elongated slot defines a length L2, and L1>L2 such that at least a portion of space within the transport container does not receive the robotic maintenance device, thereby providing a safe location away from the robotic maintenance device for an operator controlling the UAV while standing within the transport container.

The steps and elements described herein can be reconfigured and combined in many different combinations to achieve the desired technical effects in different styles of wind turbines, as may be needed in the art.

BRIEF DESCRIPTION OF THE DRAWINGS

The accompanying drawings, which are incorporated in and constitute a part of this specification, illustrate one or more embodiments of the invention and, together with a general description of the invention given above, and the detailed description given below, serve to explain the invention.

DETAILED DESCRIPTION

With reference to FIGS. 1 through 18, embodiments of a repair system and a method for automatically repairing damage around a leading edge of a wind turbine blade are shown in detail. The repair system includes at least an unmanned aerial vehicle (UAV) and a robotic maintenance device that is configured to perform repair actions to fix damages that may have developed around the leading edge of the blade. The UAV advantageously moves the maintenance device between storage and operational positions, while also controlling movements and rotations of the maintenance device to avoid collisions with a transport container and/or to properly mount the maintenance device onto the wind turbine blade. To this end, when a repair or maintenance action is required, the wind turbine moves the selected blade to a generally horizontally-extending position with the leading edge pitched upwardly, and then the maintenance device can be mounted on and move along the lengthwise length of the blade at the leading edge. The UAV remains secured to the maintenance device during the movements along the blade and during the repair actions such that the maintenance device can be quickly hoisted back off the blade when repair actions are completed. This movement of the robotic maintenance device by the UAV therefore minimizes operational downtime for conducting such maintenance and repair actions in an automated (or semi-automated) manner. The repair system and the corresponding methods of this invention produce a high quality repair with minimal time, once again helping minimize operational downtime, while also avoiding the need for rope access technicians and the associated safety and timing problems of manual repairs. Other advantages and effects of the embodiments of this invention will be evident from the following description.

Throughout this application, the correction of erosion damage on wind turbine blades is typically referred to throughout as a "repair" of those damages. In some contexts, "damage" refers to more significant damages to the blade (perhaps beyond what is described as "category-1" and "category-2" damage herein), and so the operation of the maintenance device may be deemed a routine maintenance action that occurs before a blade is "damaged" in such contexts. In this regard, it will be understood that within the context of this application, the maintenance device is capable of providing preventative maintenance to remove wear and erosion effects before such effects cause "damage" that must be repaired on the wind turbine blade, and the maintenance device is also capable of providing more thorough repairs after damage is caused on the blade.

Figure 1:
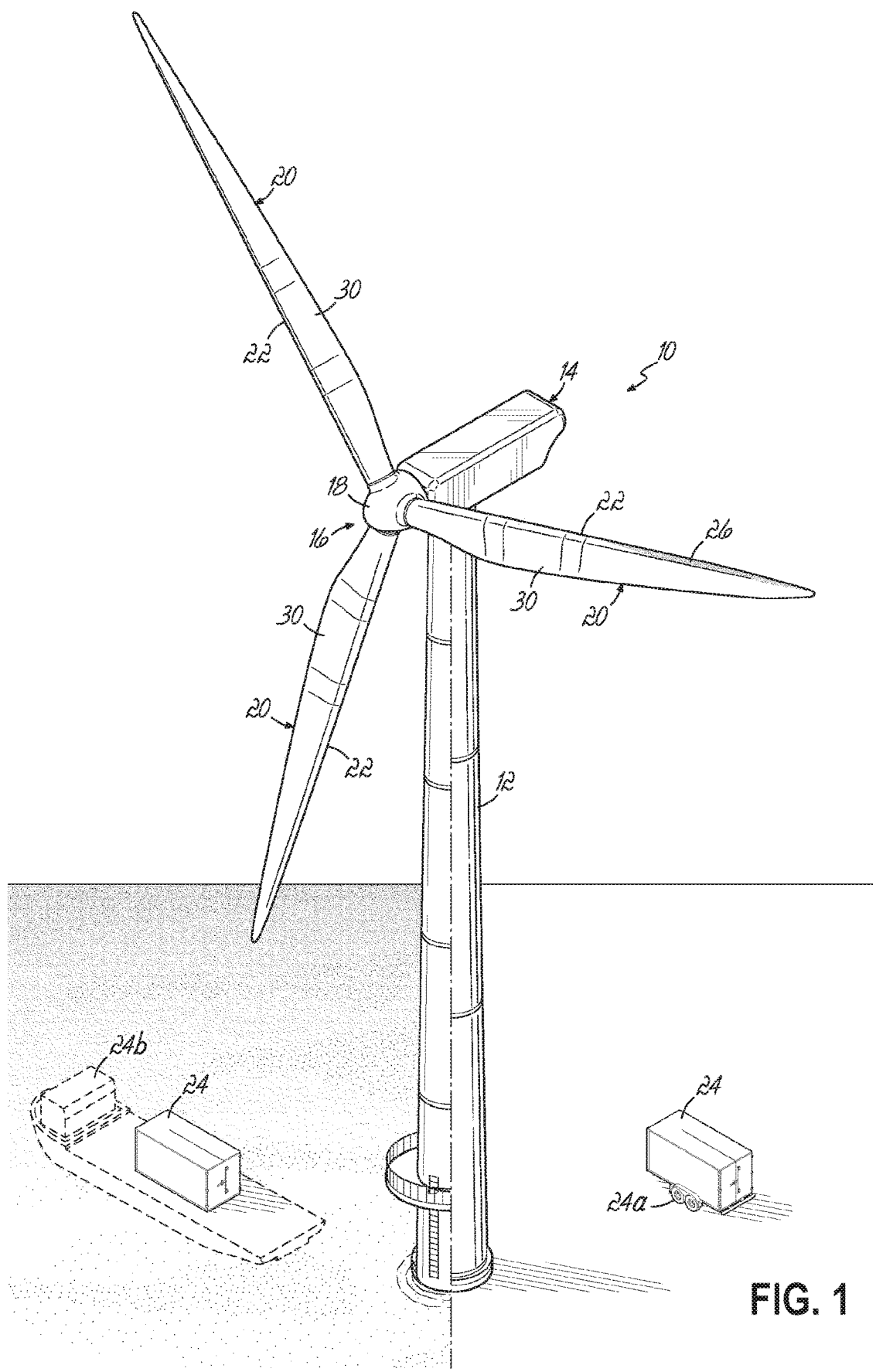
FIG. 1 is a perspective view of a wind turbine according to one embodiment of the invention.

Turning with reference to FIG. 1, a wind turbine 10 is shown to include a tower 12, a nacelle 14 disposed at the apex of the tower 12, and a rotor 16 operatively coupled to a generator (not shown) housed inside the nacelle 14. The rotor 16 of the wind turbine 10 includes a central hub 18 and a plurality of wind turbine blades 20 that project outwardly from the central hub 18 at locations circumferentially distributed around the hub 18. As shown, the rotor 16 includes three wind turbine blades 20, but the number of blades 20 may vary from one wind turbine to another. The wind turbine blades 20 are configured to interact with air flow to produce lift that causes the rotor 16 to spin generally within a plane defined by the wind turbine blades 20. As the rotor 16 spins, the wind turbine blades 20 pass through the air with a leading edge 22 leading the respective wind turbine blade 20 during rotation. As schematically evidenced by a transport container 24 shown along a ground surface at the bottom of the tower 12, the wind turbine blades 20 in use are spaced apart from the ground surface by a significant distance, which normally renders maintenance and repair actions difficult. However, the repair system of this invention improves the repair process to make automated or semi-automated repairs with the robotic maintenance device more efficient as will be set forth in detail below.

Two embodiments for a transport container 24 in accordance with different embodiments of this invention are shown on opposite sides of the wind turbine 10 in FIG. 1. The transport container 24 defines a storage space for holding the UAV and the robotic maintenance device, each of which is described in further detail below. On the right side of FIG. 1, the transport container 24 is mounted on or is incorporated in a wheeled trailer 24*a* which may be towed on roads by another vehicle along a ground surface to a position within range of the wind turbine 10. On the left side of FIG. 1, the transport container 24 is loaded like a cargo container onto a boat 24*b* or other similar vehicle that can move the repair system to a location proximate to or within range of the wind turbine 10 when such is an offshore installation rather than on land. It will be understood that the particular form for the transport container 24 and how it may be moved may be modified further in other embodiments without departing from the scope of the invention, and these are just two specific examples of how the transport container 24 can move the repair system to the site of a wind turbine 10 needing repairs. The transport container 24 may also be configured to be stationary and positioned in the middle of a wind farm or other installation containing several wind turbines 10, with the UAV having sufficient range to move the robotic maintenance device to any of the wind turbines 10 from the stationary location.

As the wind turbine 10 ages, one or more of the wind turbine blades 20 may experience erosion from prolonged, continuous exposure to the environment. One example of such erosion damage 26 is shown in FIG. 1 and better shown in the detailed view of FIG. 2. While not being particularly limited to any source, erosion damage 26 may occur due to particulates in the air that abrade the leading edge 22 of the wind turbine blade 20 during operation. Erosion therefore may occur in an erosion zone that includes the leading edge 22, but it may also occur in other areas in the exterior surface 30 of the blade 20. Accordingly, while the robotic maintenance device is configured to repair damage and move along the leading edge 22, this device is also capable of conducting maintenance and repair actions anywhere along the outer surface of the blades 20.

Figure 2:
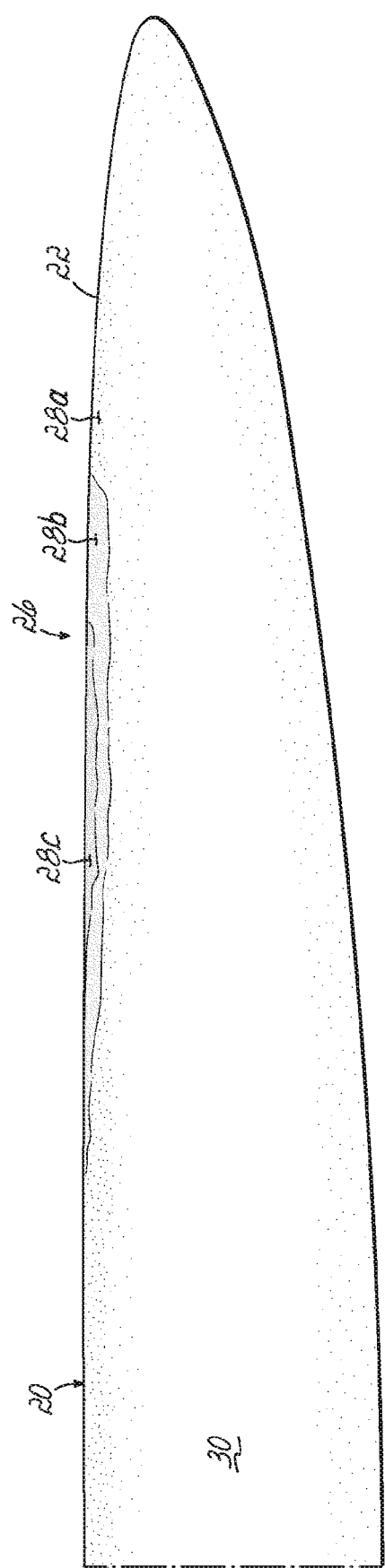
FIG. 2 is a front view of a wind turbine blade of the wind turbine of FIG. 1, showing various levels of erosion-type damage along a leading edge that is pitched upwardly.

Erosion damage 26 in the context of this application is generally characterized as a loss of material from the wind turbine blade 20. Material loss may be uniformly distributed but is often non-uniform across the leading edge 22 or any other surface of the wind turbine blade 20. Rather than losing a uniform skin of material from a surface, erosion may include localized surface imperfections, such as random pitting and shallow gouges or crack-like features that may be a result of localized, connected pitting (as a result of impacts with debris or other matter in the environment). In any case, if erosion damage 26 is not repaired in a timely fashion, the wind turbine blade 20 becomes less efficient at rotating the rotor 16 and ultimately, the structural integrity of the wind turbine blade 20 may be significantly impaired. With reference to the detailed view in FIG. 2, it will be understood that the erosion damage 26 may define differing levels of severity based on how deep the damage extends inwardly into the material layers defining the outer shell of the blade 20. In the example shown, the erosion damage 26 includes some areas with an erosion or cut of material through the outer topcoat layer into a second layer of material underneath the topcoat, which is categorized as a "category 1" level of severity, and further areas with an erosion or cut of material through the outer topcoat layer and the second later of material into a third layer of material underneath the second layer, which is categorized as a "category 2" level of severity. For reference, deeper cuts and erosions defining more significant damage is typically categorized at higher levels such as category 3, 4, or 5. In FIG. 2, the topcoat is shown at 28*a*, the revealed areas of second layer are shown at 28*b*, and the revealed areas of third layer are shown at 28*c*. These various layers 28*a*, 28*b*, 28*c* of material may optionally be different in color, which can help with the identification of damage severity and repair confirmation after the repair is completed with the maintenance device. By identifying and correcting so-called lower levels of erosion damage 26 promptly by maintenance-style "repair actions," more significant damage of the blade 20 can be avoided along with higher operational downtime caused by the more significant damage.

Figure 3:
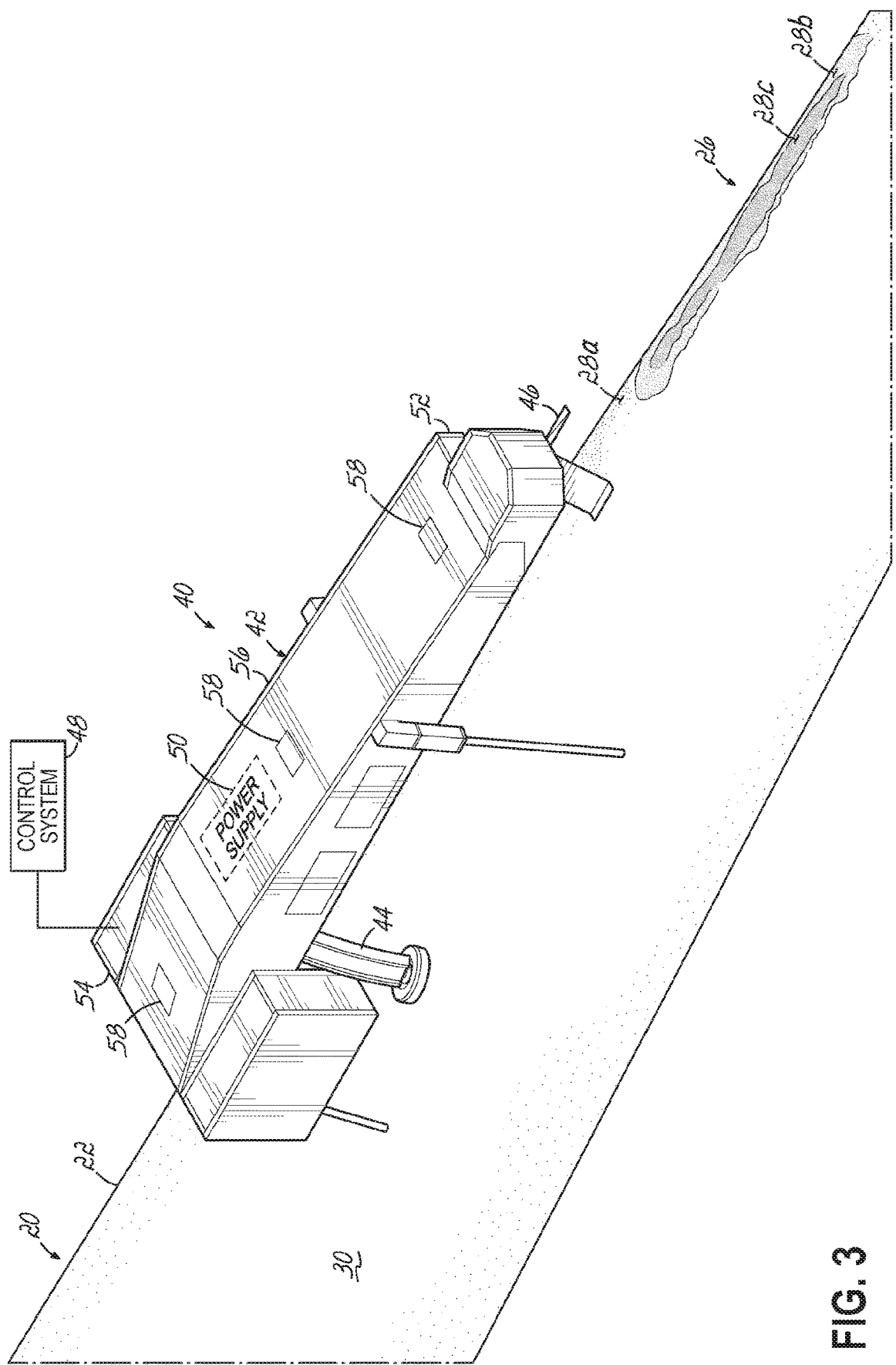
FIG. 3 is a top perspective view of a robotic maintenance device in accordance with embodiments of the present invention, mounted in position on the leading edge of the wind turbine blade of FIG. 2 with an applicator tool positioned to move over the exterior surface of the wind turbine blade to apply a coating to repair the damage.

FIG. 3 provides an overview of one exemplary robotic maintenance device 40 that may be used with repair systems and methods in accordance with embodiments of this invention. The robotic maintenance device 40 is shown in an operation position in this view for conducting repair/maintenance actions on the wind turbine blade 20. The maintenance device 40 includes a main chassis 42 (may also be referred to as a main body) having one or more support elements 44 such as wheels or the like extending towards opposite sides of the leading edge 22 of the blade 20 when the maintenance device 40 is mounted atop the leading edge 22 of the blade 20 as shown in this Figure. The support elements 44 may interact with or define part of a drive that can move the maintenance device 40 along the blade 20. The maintenance device 40 further includes an applicator tool 46 mounted on the main chassis 42 and configured to apply a coating material over the exterior surface 30 of the blade 20. Although the applicator tool 46 is shown in this Figure to include a spatula-type device for spreading and forming the coating material into a shaped coating that fills in and covers up any damage, it will be understood that alternative types of applicator tools may be provided in other embodiments without departing from the scope of the invention.

Although not shown in this Figure, the maintenance device 40 may also include a sander tool that can be moved along the exterior surface 30 at and adjacent damaged areas to abrade such surfaces and prepare same for receipt of the coating material. The maintenance device 40 further includes a control system 48 that operates each of these elements as well as any further devices, tools, or modules installed on the maintenance device 40. The maintenance device 40 is therefore configured to perform repair actions as it moves along a longitudinal length of the leading edge 22 of the blade 20. Additionally, a power supply 50 such as a battery pack to be used with the UAV may be mounted on the maintenance device 40 for purposes to be described below, the power supply 50 being shown schematically in FIG. 3. Further details of the maintenance device 40 will be discussed below where pertinent to the new aspects of the repair system and method provided herein.

In the embodiment of the robotic maintenance device 40 shown in FIG. 3, the maintenance device 40 defines a generally elongate shape defined between a front end 52, which may include the applicator tool 46, and a rear end 54, which typically faces towards a root end of the blade 20 when the maintenance device 40 is mounted on the leading edge 22. A central portion 56 is defined between the front and rear ends 52, 54 and includes the center of gravity of the maintenance device 40 (with any attachments or modules included). A mounting point 58 is provided at each of the front end 52, the rear end 54, and the central portion 56 to allow for connection to various wires used to move the maintenance device 40 as described in further detail below. The mounting points 58 are shown schematically as they may be defined by any type of connection structure known in this field.

Figure 4:
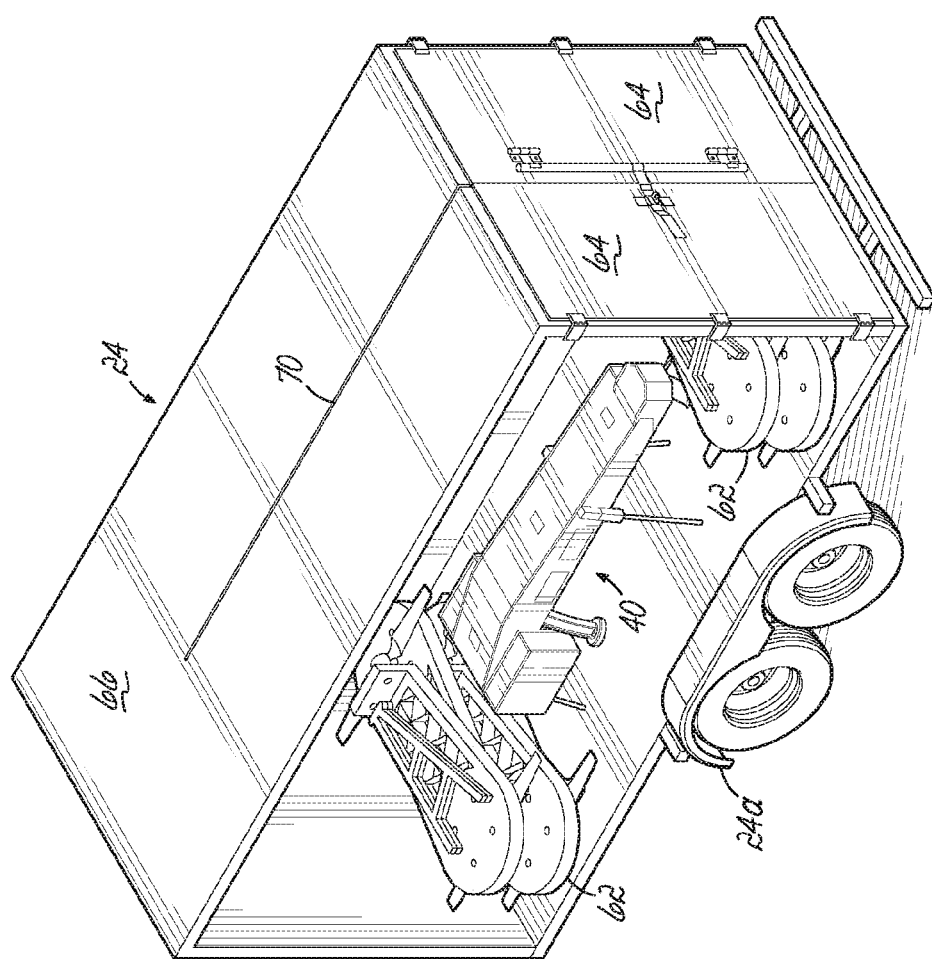
FIG. 4 is a top perspective view of a transport container with one side removed to reveal an unmanned aerial vehicle (UAV) in a disassembled state and the robotic maintenance device of FIG. 3, each stored within a storage space defined within the transport container.

Beginning with FIG. 4, a series of operational steps are illustrated in accordance with one embodiment for providing repair of damage at a wind turbine, and more particularly to a blade of the wind turbine. In FIG. 4, the robotic maintenance device 40 described in detail above is shown in a storage position, specifically in this embodiment located inside a transport container 24. The transport container 24 is shown with one longitudinal sidewall removed so as to reveal the storage space that is enclosed within the container 24. The transport container 24 may be mounted on a wheeled trailer as shown or may be transported by boat or other movement means to a position within range of a wind turbine 10 with a blade to be repaired. Alternatively, the transport container 24 may be reformulated as a stationary storage container in other embodiments and then positioned in the middle of a wind farm or other multi-turbine installation such that the repair system is within range of wind turbines 10 to be repaired. In addition to the maintenance device 40, the repair system also includes an unmanned aerial vehicle ("UAV") 62, which is shown stored in a partially-disassembled state in FIG. 4 within the enclosed storage space. By "within range" in the context of this application, the transport container 24 is positioned such that the UAV 62 can fly to the wind turbine 10 to be repaired and return successfully, e.g., the UAV 62 has sufficient powering and endurance to perform all of the steps of the repair method described in detail with reference to FIGS. 4-15.

Figure 5:
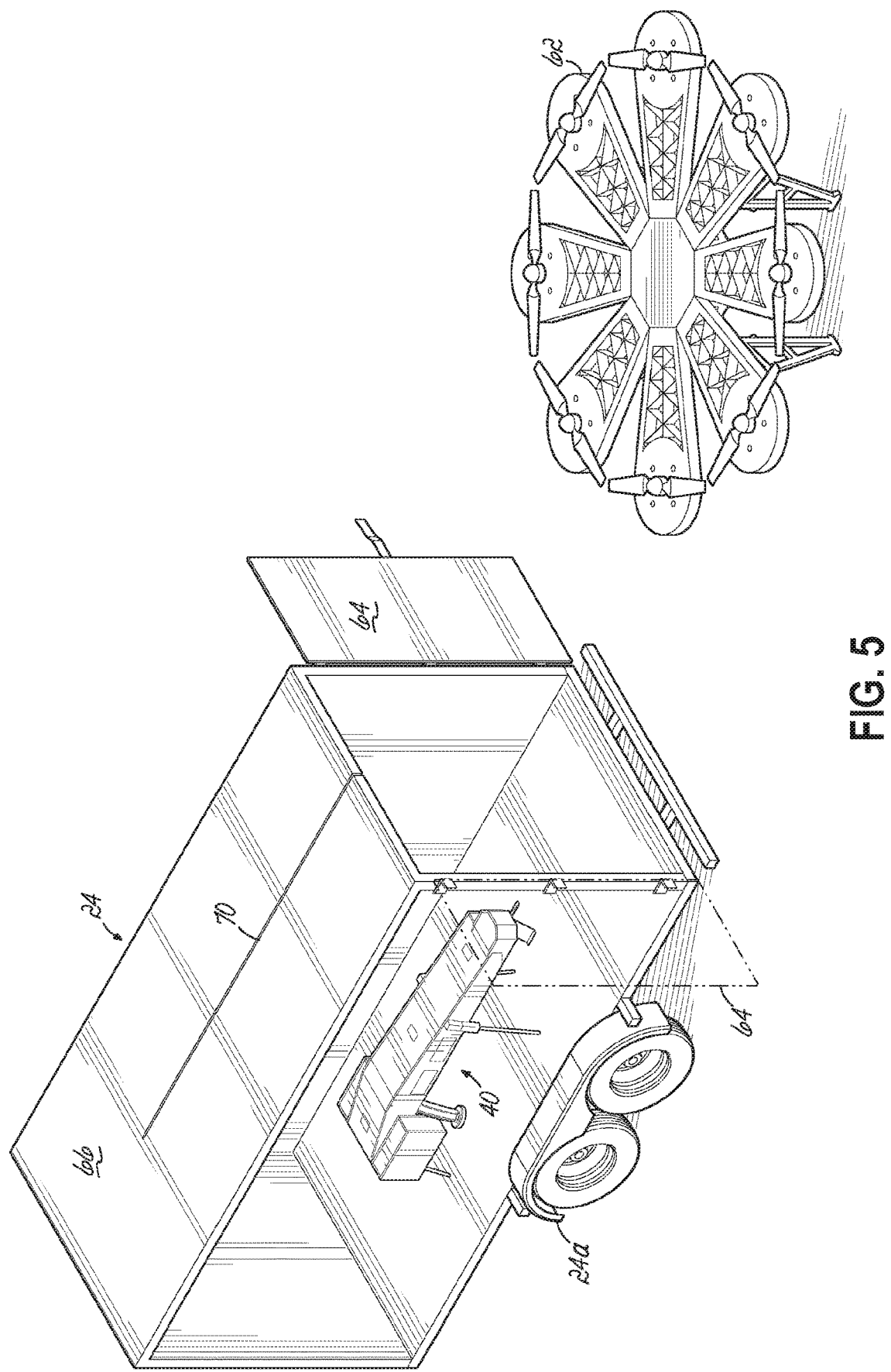
FIG. 5 is a perspective view showing a further operational state of a method in accordance with embodiments of the invention, specifically in which the UAV has been removed from the transport container and assembled.
Figure 6:
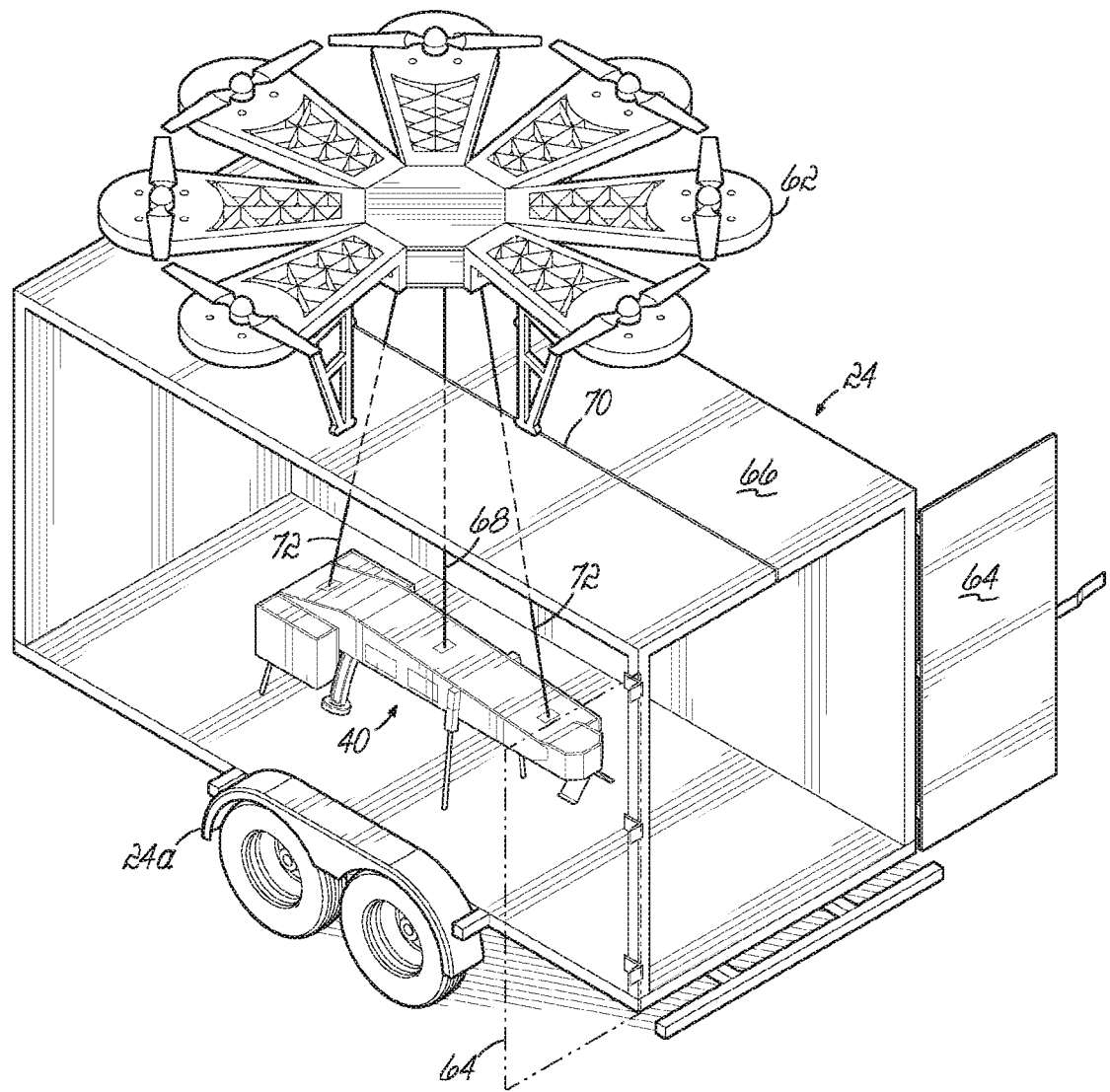
FIG. 6 is a perspective view similar to FIG. 5 and showing a subsequent operational state of the method, specifically in which the UAV is parked on top of the transport container and is being secured to the robotic maintenance device.

Next in FIG. 5, the repair method continues by opening a rear door 64 of the transport container 24 to open access into the storage space, at which point the parts of the UAV 62 are removed from the container 24. In embodiments where the UAV 62 is transported or stored in a disassembled state, the method includes the step of assembling the UAV 62 on a ground surface adjacent the container 24. The UAV 62 may be any of several known drone designs while remaining in accordance with the present invention, e.g., those typically controlled remotely by an operator. As such, the structural details of the UAV 62 are not explained in detail herein as the known designs will be readily understood by those skilled in the art.

Once the UAV 62 is assembled and/or removed from the transport container 24, an operator moves the UAV 62 on top of the transport container 24 and generally will park the UAV 62 on a roof 66 at the top end thereof. As revealed by the removed portion of the UAV 62 in FIG. 6, a series of lines are secured to the UAV 62 (such as when the UAV 62 is assembled on the ground surface before initial flight) as follows. At least one support line 68 is secured to the UAV 62 and extends downwardly through an elongated slot 70 provided in the roof 66 of transport container 24. The support line 68 is a cable, wire, or similar support that is load-rated and configured to support more than the full weight of the robotic maintenance device 40, and the support line 68 is secured by the operator to the central portion 56 of the maintenance device 40 as shown. At least two control lines 72 are also secured to the UAV 62 and extend downwardly in this embodiment through the same elongated slot 70 for connection to the front end 52 and the rear end 54 of the maintenance device 40. Each of the support line(s) 68 and control lines 72 are connected to the mounting points 58 provided on the maintenance device 40 as previously described. The control lines 72 may be provided from similar wires or cables as used for the support line 68, in one example, with each being configured to hoist loads over 200 kg. After the UAV 62 and the maintenance device 40 are secured to one another using these various lines, the UAV 62 is ready to move the maintenance device 40 in further steps of the repair method.

In some embodiments, a power supply 50 for the UAV 62 is mounted on the maintenance device 40 rather than on the body of the UAV 62 itself, such an arrangement being previously shown schematically in FIG. 3. In such embodiments, the power supply 50 will be connected to the UAV 62 motors/drive mechanism using a cable (not shown) that runs along and is associated with the at least one support line 68. The cable transmits operating power from the power supply 50 to the UAV 62 such that the UAV 62 can be principally powered by a power supply 50 that is not loading or weighing down the UAV 62 when the maintenance device 40 is mounted on and operating on the wind turbine blade 20. Consequently, a total load on the UAV 62 is reduced during the hovering actions, and an overall endurance or operating time of the repair system and the UAV 62 can be increased with such an arrangement.

Figure 7:
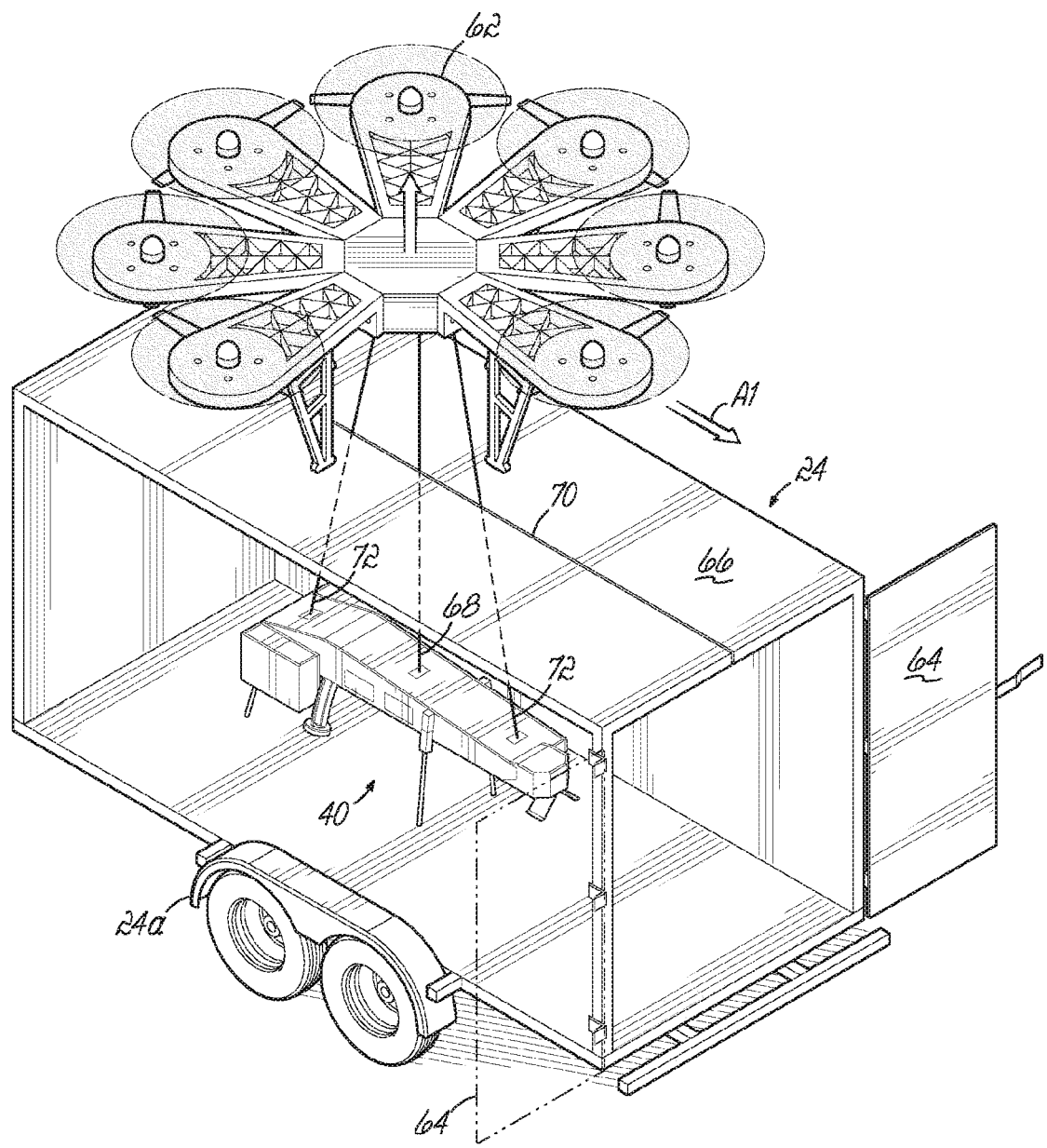
FIG. 7 is a perspective view similar to FIG. 6 and showing a subsequent operational state of the method, specifically in which the UAV has lifted and is moving the robotic maintenance device out of a rear door of the transport container.

The UAV 62 will then be activated and will hover as shown by the rotating propellers in FIG. 7 to lift the maintenance device 40 within the transport container 24. In this position, the UAV 62 is in position to remove the maintenance device 40 from the storage position in the transport container 24. That removal occurs by generally horizontal flight movement of the UAV 62 towards the rear door 64 at one longitudinal end of the container 24 as shown by arrow A1 in FIG. 7. Advantageously, the elongated slot 70, which extends longitudinally from the rear door 64 along the roof 66, limits lateral/traverse movements of the support line 68 and the control lines 72 as the UAV 62 moves the maintenance device 40 into or out of the container 24. To this end, each of the support line 68 and the control lines 72 slides along the elongated slot 70 to guide the UAV-driven movements of the maintenance device 40, such as to prevent the maintenance device 40 from rotating undesirably about a vertical axis and/or from bumping into sidewalls of the container 24. Further details and options for the elongated slot 70 in the transport container 24 are described in further detail below with reference to FIGS. 16-18.

Figure 8:
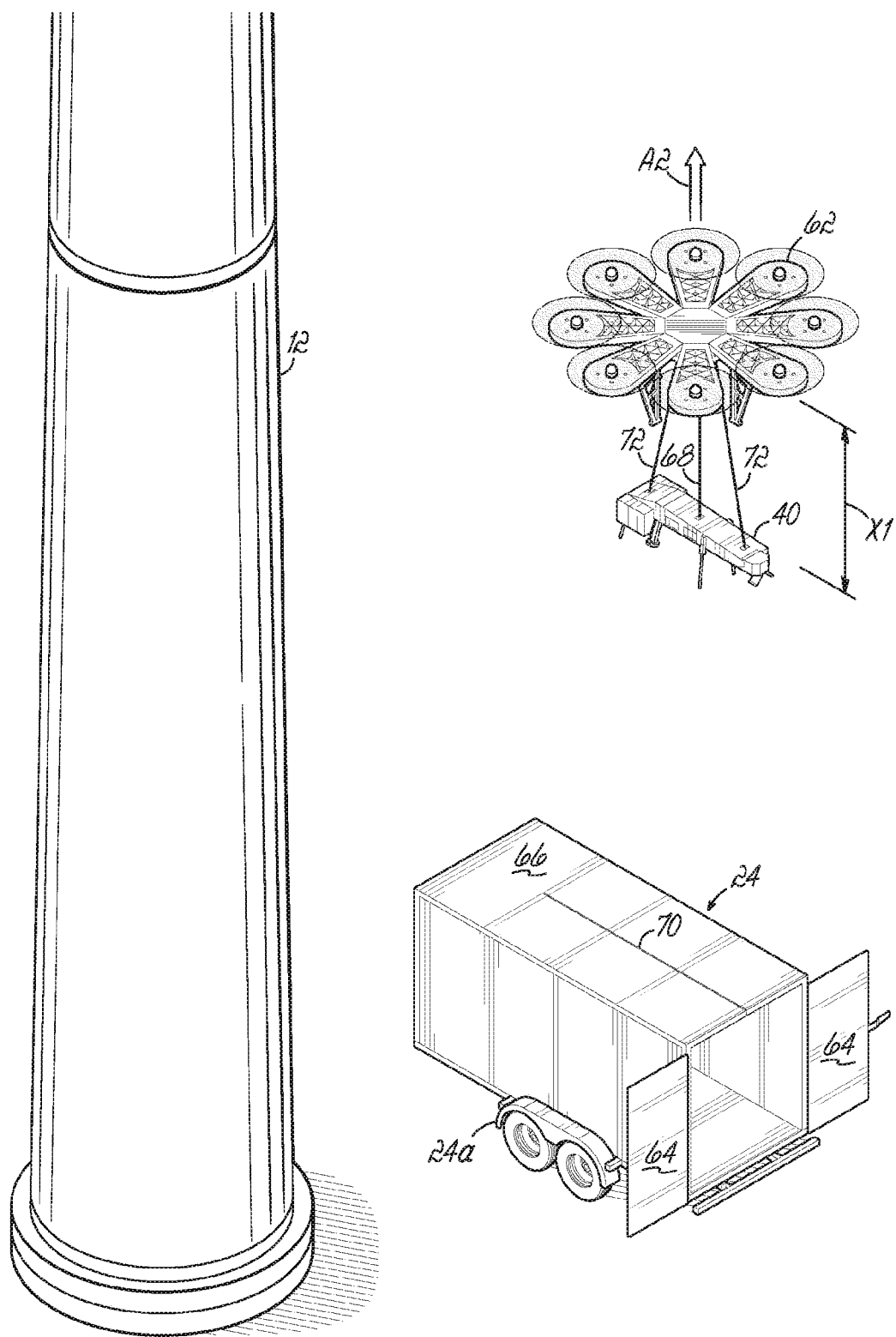
FIG. 8 is a perspective view similar to FIG. 7 and showing a subsequent operational state of the method, specifically in which the UAV hoists the robotic maintenance device away from a ground surface and the transport container.

After the UAV 62 has removed the maintenance device 40 from the transport container 24, the UAV 62 is then in position to hoist or lift the maintenance device 40 up to the operation position and the wind turbine blade 20. In FIG. 8, this step of the repair method is shown by the UAV 62 moving upwardly from proximate the ground surface as shown by arrow A2. The provision of the various lines allows the UAV 62 to continue to control the orientation and positioning of the maintenance device 40 during movements to the operation position. In this regard, the support line 68 is secured to the UAV 62 and to the maintenance device 40 and defines a length in this configuration that creates a first spacing X1 between the UAV 62 and the maintenance device 40. The securements of the UAV 62 to the maintenance device 40 at the front and rear ends 52, 54 using the control lines 72 allows the UAV 62 to control rotations of the maintenance device 40 about a vertical axis, which means that the UAV 62 maintains control over the longitudinal alignment of the maintenance device 40 thanks to the control lines 72. In combination, the securing of the maintenance device 40 at a relatively small first spacing X1 and with the additional at least two control lines 72 provides precise control of movements and orientation/positioning of the maintenance device 40 during these movements. For example, undesirable and/or uncontrollable rotations of the maintenance device are avoided when securing the UAV 62 to the maintenance device 40 as set forth herein.

Figure 9:
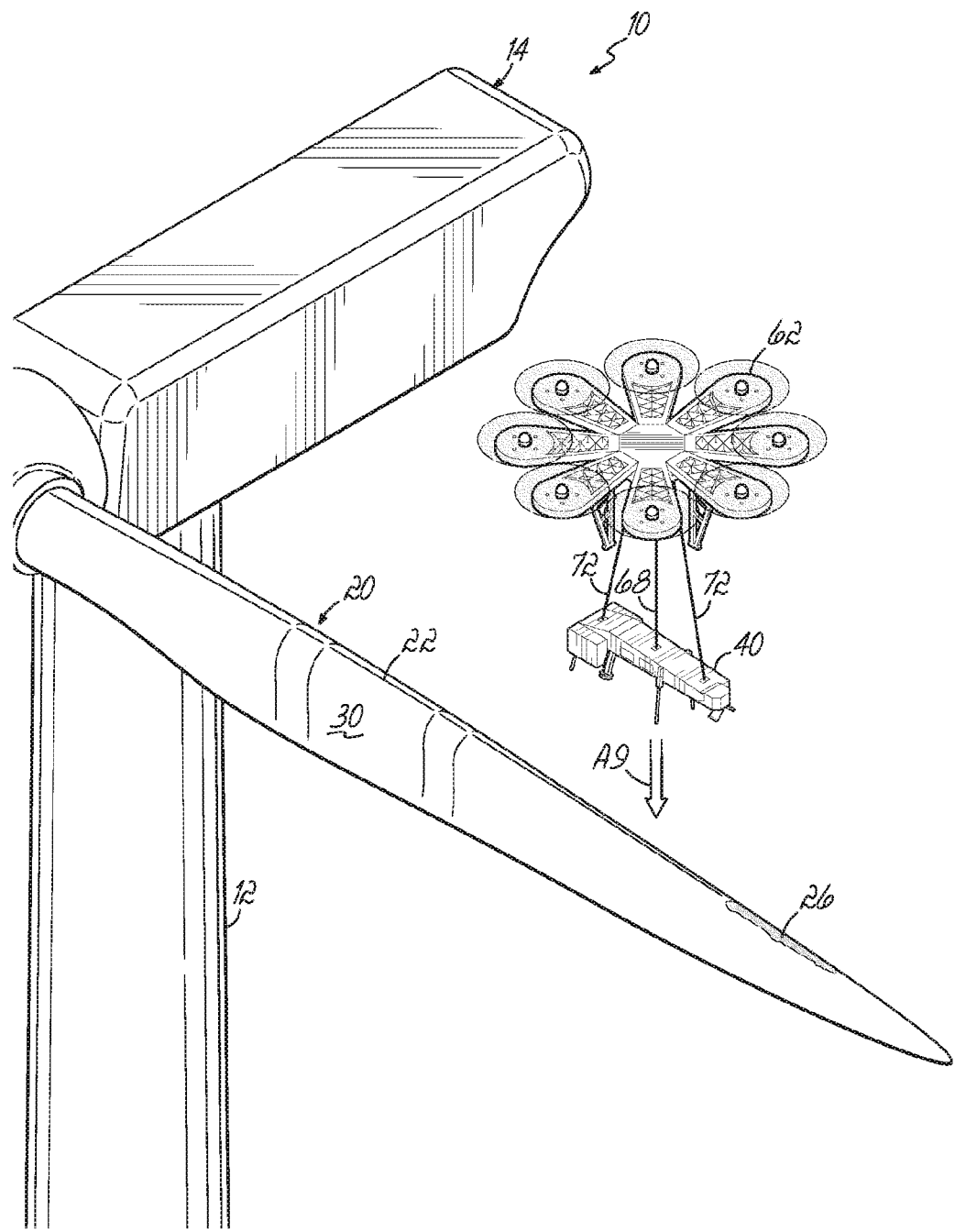
FIG. 9 is a perspective view similar to FIG. 8 and showing a subsequent operational state of the method, specifically in which the UAV is lowering the robotic maintenance device into an operational position so as to be mounted on the wind turbine blade.

Such control of the maintenance device 40 is advantageous for the next step of the repair method, which is shown in detail in FIG. 9. In order to prepare the wind turbine blade 20 for receiving the robotic maintenance device 40, it will be appreciated that the wind turbine 10 is halted with the blade 20 to be worked upon extending in a generally horizontal orientation with the blade 20 then pitched so that the leading edge 22 faces upwardly to receive the maintenance device 40. As shown in FIG. 9, this positioning of the blade 20 also moves the damaged areas 26 into position for being worked on by the maintenance device 40. The positioning and pitching of the blade 20 can occur shortly before the UAV 62 moves the maintenance device 40 so as to minimize an operational downtime for the wind turbine 10 that occurs before repair actions can be taken out on the blade 20. The UAV 62 then lowers the maintenance device 40 as shown by arrow A9 into engagement with the blade 20 and such that the support elements 44 securely retain the main chassis 42 in position above the leading edge 22 of blade 20. The control against rotations enabled by the securements with the at least one support line 68 and the at least two control lines 72 allows for the maintenance device 40 to be properly aligned during lowering onto the surface of the blade 20. Once landed onto the blade 20 in the operation position, the maintenance device 40 is ready to perform repair actions as briefly described above (e.g., optional abrading and the applying coating to the exterior surface 30 at locations containing damage 26).

Figure 10:
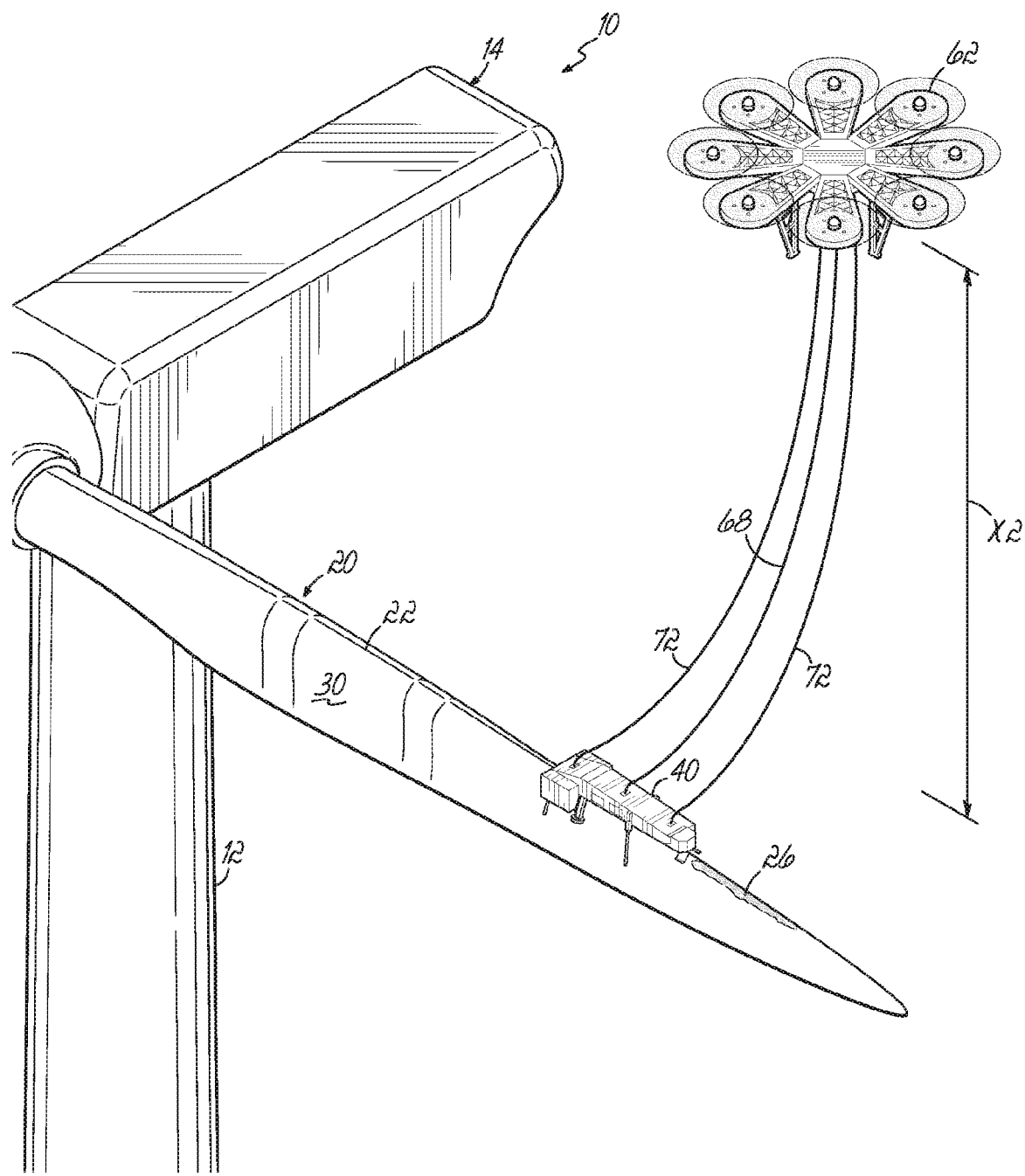
FIG. 10 is a perspective view similar to FIG. 9 and showing a subsequent operational state of the method, specifically in which the UAV moves farther away from the robotic maintenance device to hover during the repair actions at the wind turbine blade.

To avoid interference with any part of the repair actions, the UAV 62 may then be moved farther away from the maintenance device 40 in a next step of the repair method shown in FIG. 10. At a minimum, the UAV 62 and/or the support line 68 are moved such that the full loading tension force in the support line 68 is removed and only a minimum "pretension" is maintained, which is understood to mean some "slack" is provided in the support line 68 such that the securement between the UAV 62 and the maintenance device 40 does not affect movements or operations of the maintenance device 40 while the latter is mounted on the wind turbine blade 20. In the embodiment shown in FIG. 10, the at least one support line 68 is extended in length between the securement points on the UAV 62 and on the maintenance device 40 such that only a minimum pretension is maintained in the support line 68, this being evidenced by the curved, "slack" configuration of the support line 68 as shown. Note that while the UAV 62 is also moved farther away from the maintenance device 40 in the views shown in FIG. 10 (and the alternative in FIG. 10A described below), the UAV 62 could instead be maintained at the first spacing described above in some embodiments, with the tension in the support line 68 reduced to a minimum pretension solely by the aforementioned extension of the support line 68. For the sake of clear illustration, both steps are done in the embodiment shown, but the maintenance device 40 is free to operate so long as the full tension is removed from the support line 68 (and the control lines 72, when applicable).

In the embodiment shown in FIG. 10, the control lines 72 also remain secured to the maintenance device 40 during operation at the blade 20, and as such, the control lines 72 would also be extended to remove a full loading tension therein and leave just a minimum pretension in the control lines 72. Regardless of how much the support line 68 and the control lines 72 are extended in this step of the repair method, the UAV 62 is hovered within a maximum range of the maintenance device 40 during the subsequent steps, the maximum range being defined by a length of the support line 68 after such has been extended. To this end, the UAV 62 therefore does not interfere with movements or actions of the maintenance device 40 when the maintenance device 40 is operating on the blade 20.

In some embodiments, the extension of the support line 68 and the control lines 72 allows for the UAV 62 to move farther away from the maintenance device 40, which may be desirable to avoid having any wind turbulence generated by the UAV 62 hovering from impacting the blade 20 where repair actions are taking place. As shown in FIG. 10, the UAV 62 may specifically be moved to a second spacing X2 from the maintenance device 40 that is larger than the first spacing X1. The second spacing X2 may be more than 10 times the first spacing X1, to thereby avoid having the UAV 62 affect the performance and operations of the maintenance device 40. In one particular example, the first spacing X1 may be about 0.5 meter, while the second spacing X2 can be up to 20 meters. As noted above, regardless of the spacing provided in this step of the repair method, the UAV 62 is hovered within the range defined by the length of the support line 68 so as to maintain just the minimum pretension in the support line 68, as well as in the control lines 72 when those remain secured as shown in FIG. 10.

Various securing elements or tools can be used to enable the extension of the support line 68 and/or the control lines 72. For example, a winch mechanism (not shown) can be provided on the UAV 62 for allowing selective extension and/or retraction of the lines 68, 72. Alternatively, a one-way reeling mechanism can be used at the securing point of the lines 68, 72 to the UAV 62, such a mechanism allowing for the extension of the line(s) 68, 72 to occur only after the maintenance device 40 is mounted on the blade 20. Other mechanisms of a similar nature may be used in other embodiments while remaining consistent with the scope of the invention, so long as the process steps described here are enabled for the repair method.

Figure 10A:
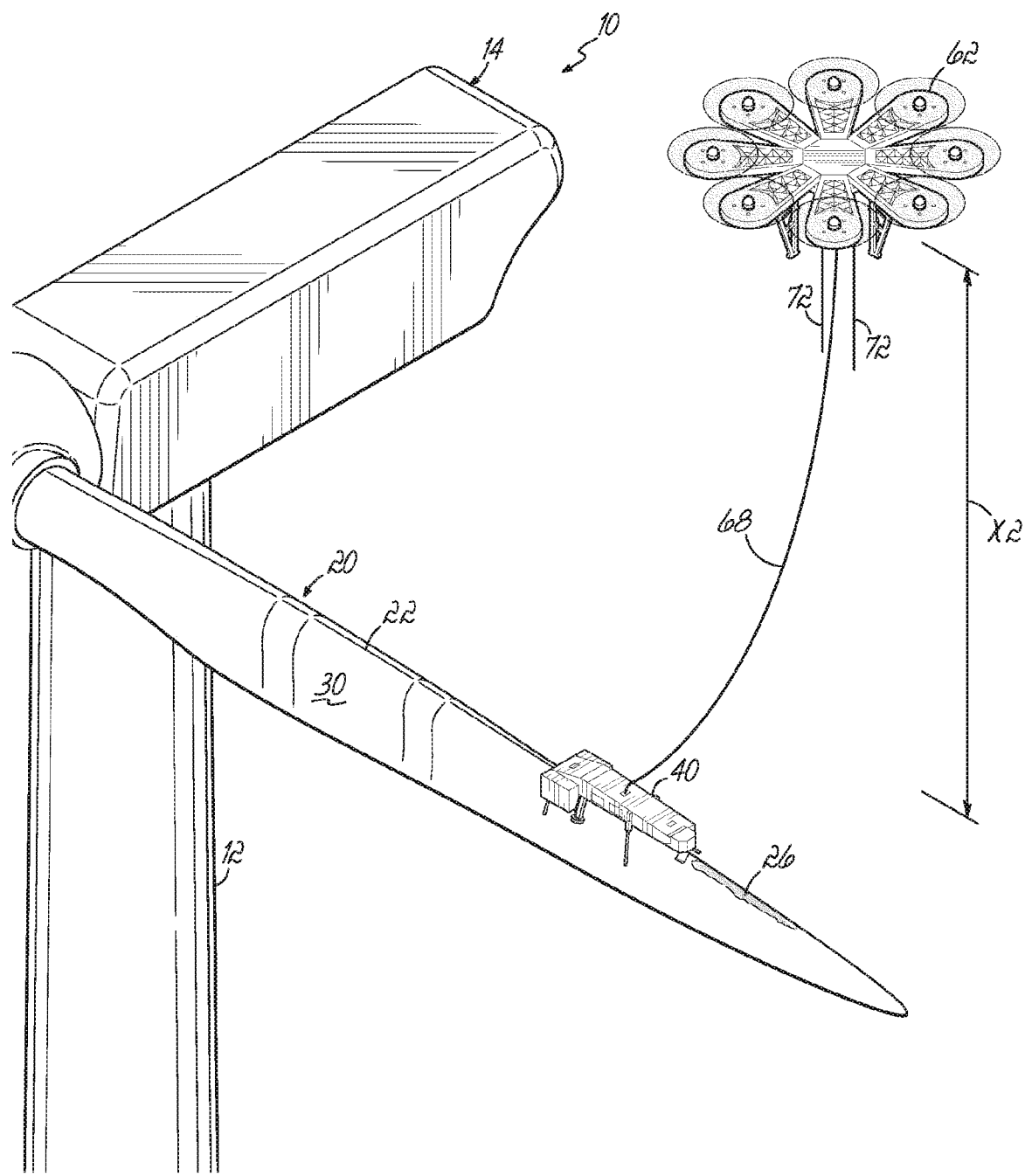
FIG. 10A is a perspective view similar to FIG. 10 and showing an alternative operational state of the method, specifically in which an optional detachment of two control lines has occurred when the UAV moves farther away to hover during the repair actions.
Figure 11:
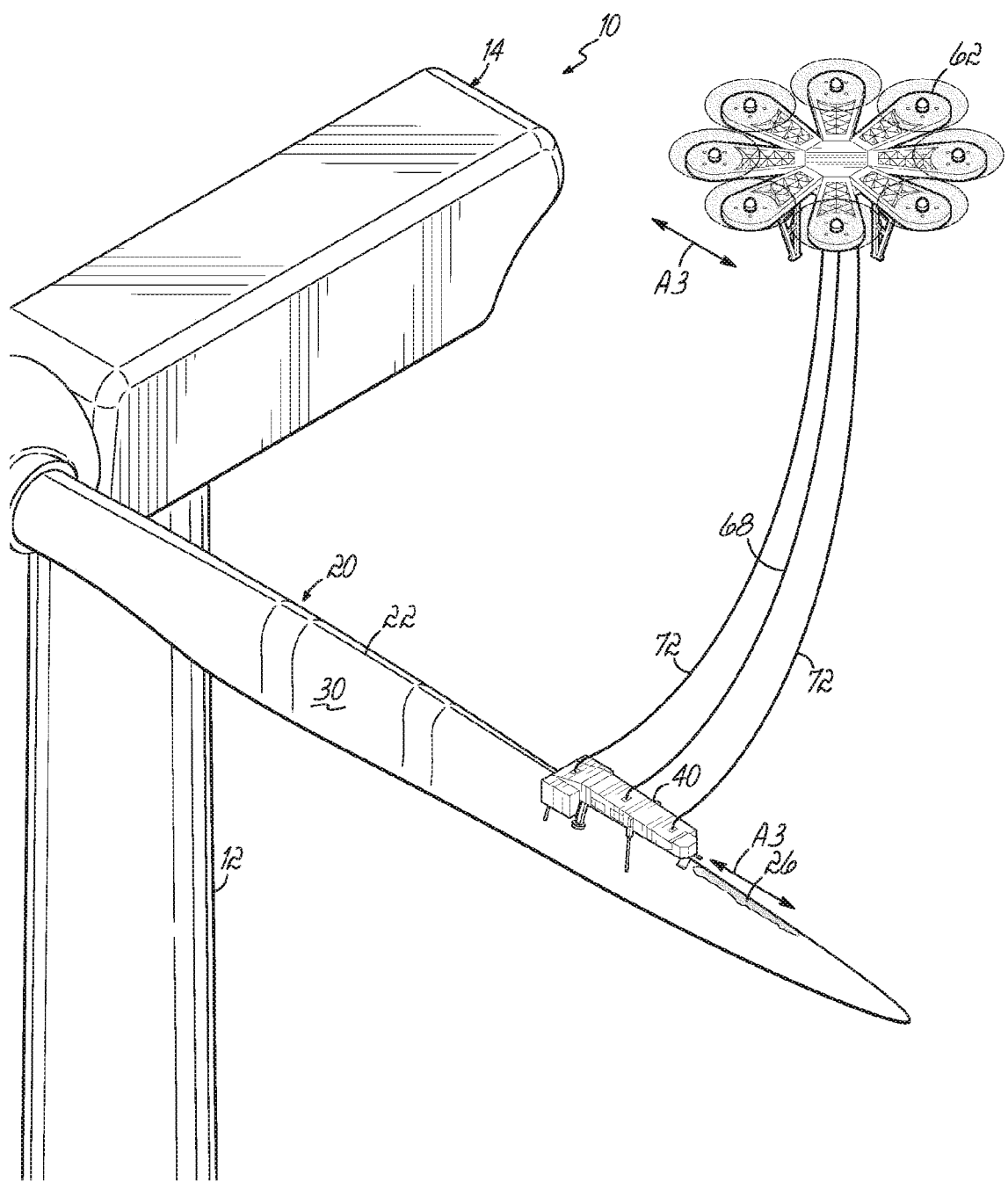
FIG. 11 is a perspective view similar to FIG. 10 and showing a subsequent operational state of the method, specifically in which the robotic maintenance device is moving along the longitudinal length of the wind turbine blade to perform the repair actions.

An alternative of this same step of the repair method is shown in FIG. 10A. Unlike in FIG. 10, in which both the support line 68 and the control lines 72 are maintained in connection between the UAV 62 and the maintenance device 40, in this embodiment the control lines 72 are disengaged from the mounting points 58 on the robotic maintenance device 40. Such a disengagement can occur before the support line 68 is extended such that the control lines 72 do not require any winch or other extension/retraction mechanism at the UAV 62. Likewise, this results in the short-in-length control lines 72 to extend freely downwardly from the UAV 62 when the UAV 62 moves to a second spacing to hover during operations of the maintenance device 40 on the blade 20. The arrangement in the embodiment of FIG. 10A may therefore simplify the structures necessary to implement the repair method, and in such an embodiment, the support line 68 would continue to be used to support the load of the maintenance device 40 and return same to the storage position in the following steps to be described.

With the UAV 62 moved away so as to not interfere with the repair actions, the maintenance device 40 is now ready to perform those maintenance and repair actions on the blade 20. This step of the repair method is indicated by movement arrows A3 in FIG. 11. One such movement arrow A3 is also shown next to the hovering UAV 62 because in some embodiments, the UAV 62 is controlled to follow the movements of the maintenance device 40 as the latter moves along the longitudinal length of blade 20. The UAV 62 just needs to stay within the maximum range defined by the length of the support line 68 (and/or the control lines 72, which are shown in the FIG. 11 embodiment to remain connected between the UAV 62 and the maintenance device 40 with a minimum pretension). The repair actions are in accordance with the example description above, e.g., an optional abrading of the exterior surface 30 with a sander to prepare the blade 20 for receiving a coating, and then applying a shaped coating to fill in and cover up the damage 26 on the exterior surface 30 of blade 20.

Figure 12:
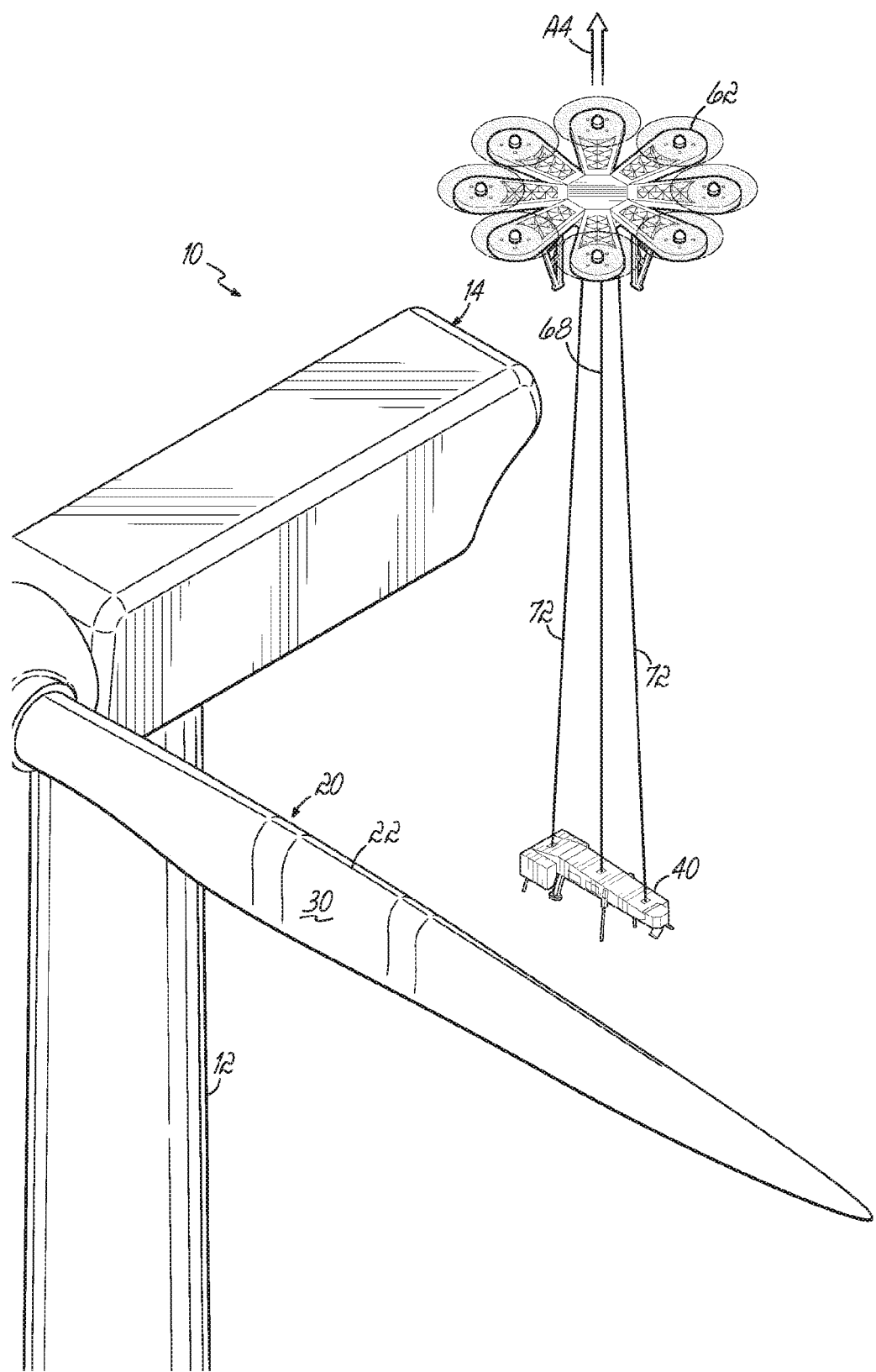
FIG. 12 is a perspective view similar to FIG. 11 and showing a subsequent operational state of the method, specifically in which the UAV hoists the robotic maintenance device off of the wind turbine blade after repairs are completed.

After completing the repair actions, which is shown by the lack of visible damage 26 in the next view of FIG. 12, the maintenance device 40 is ready to be removed from the blade 20. As such, the next step of the repair process is shown, in which the UAV 62 moves above the maintenance device 40 and lifts it off the blade 20 along movement arrow A4. In the illustrated embodiment, no retraction of the support line 68 occurs before this movement, so the UAV 62 remains at the larger second spacing from the maintenance device 40 for the movements back towards the ground surface and the storage position. Remaining at the second spacing is acceptable because the highest amount of positioning and rotation precision is typically only needed when mounting the maintenance device 40 on the blade 20 at the operation position. It will be understood that in embodiments where the UAV 62 includes a winch or similar mechanism at the securement of the lines, the support line 68 (and/or the control lines 72, if such are still connected) can optionally be retracted back to a first spacing or some other smaller spacing before this movement step occurs. Likewise, in embodiments like the alternative shown in FIG. 10A, the control lines 72 remain disconnected during this movement and so the entire load of the maintenance device 40 is carried by the at least one support line 68.

Figure 13:
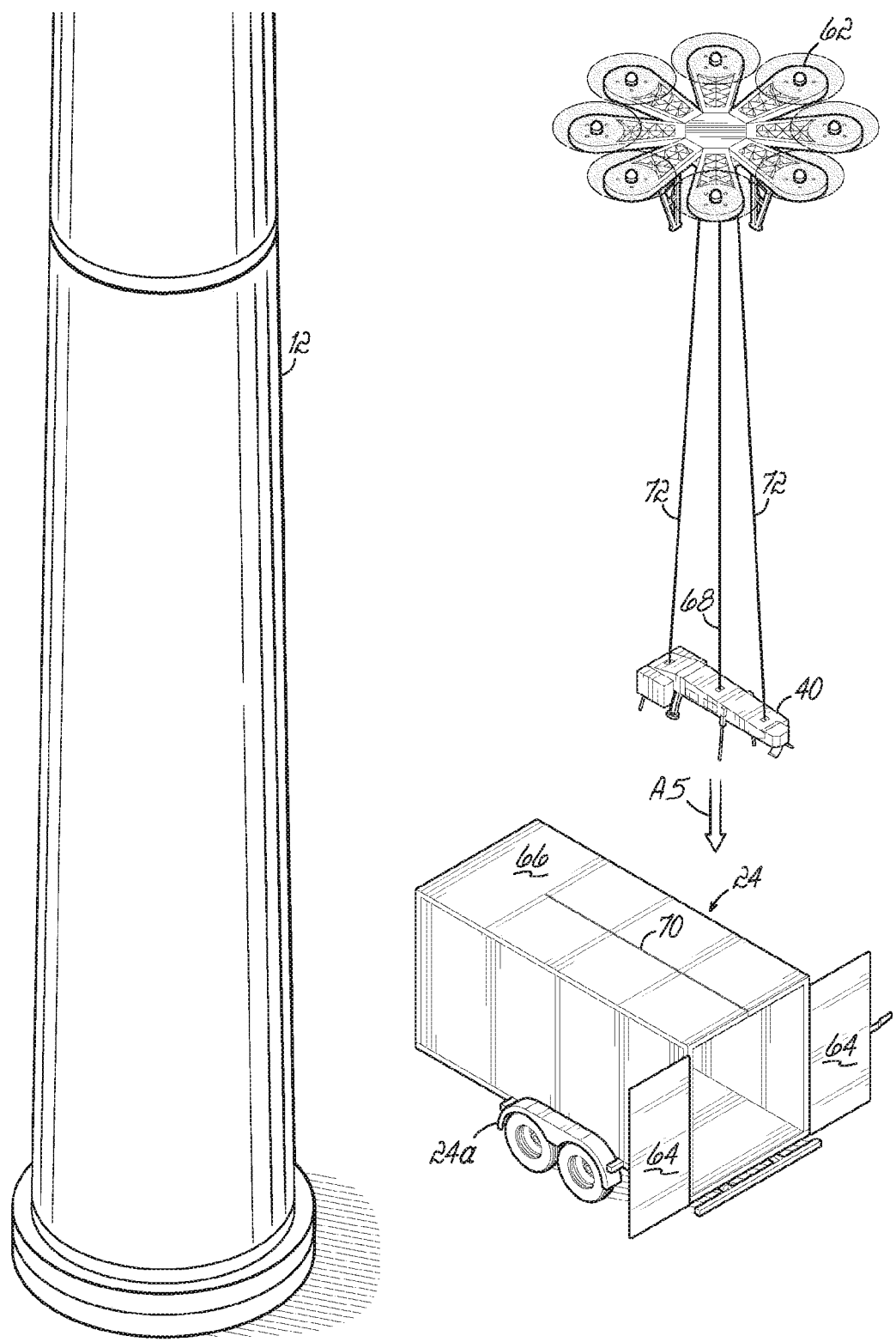
FIG. 13 is a perspective view similar to FIG. 12 and showing a subsequent operational state of the method, specifically in which the UAV has lowered the robotic maintenance device back to the transport container and the ground surface.

The UAV 62 then moves down towards the ground surface in a next step of the repair process, as shown by movement arrow A5 in FIG. 13, which is towards the transport container 24 in the example embodiment shown. It will be appreciated that as soon as the UAV 62 has moved the maintenance device 40 out of the rotation area of the wind turbine 10, the blades 20 of the wind turbine 10 can be activated again to rotate and begin generating electrical energy, which again reduces or minimizes the total operational downtime needed for the repair actions. The following steps of movement of the maintenance device 40 with the UAV 62 generally follow in a reverse order the movements that were described in detail above when moving in the opposite direction from the storage position to the operation position. To this end, the UAV 62 will move the maintenance device 40 down to the rear door 64 of the transport container 24 and will then laterally move to insert the maintenance device 40 back into the storage space within the container 24.

Figure 14:
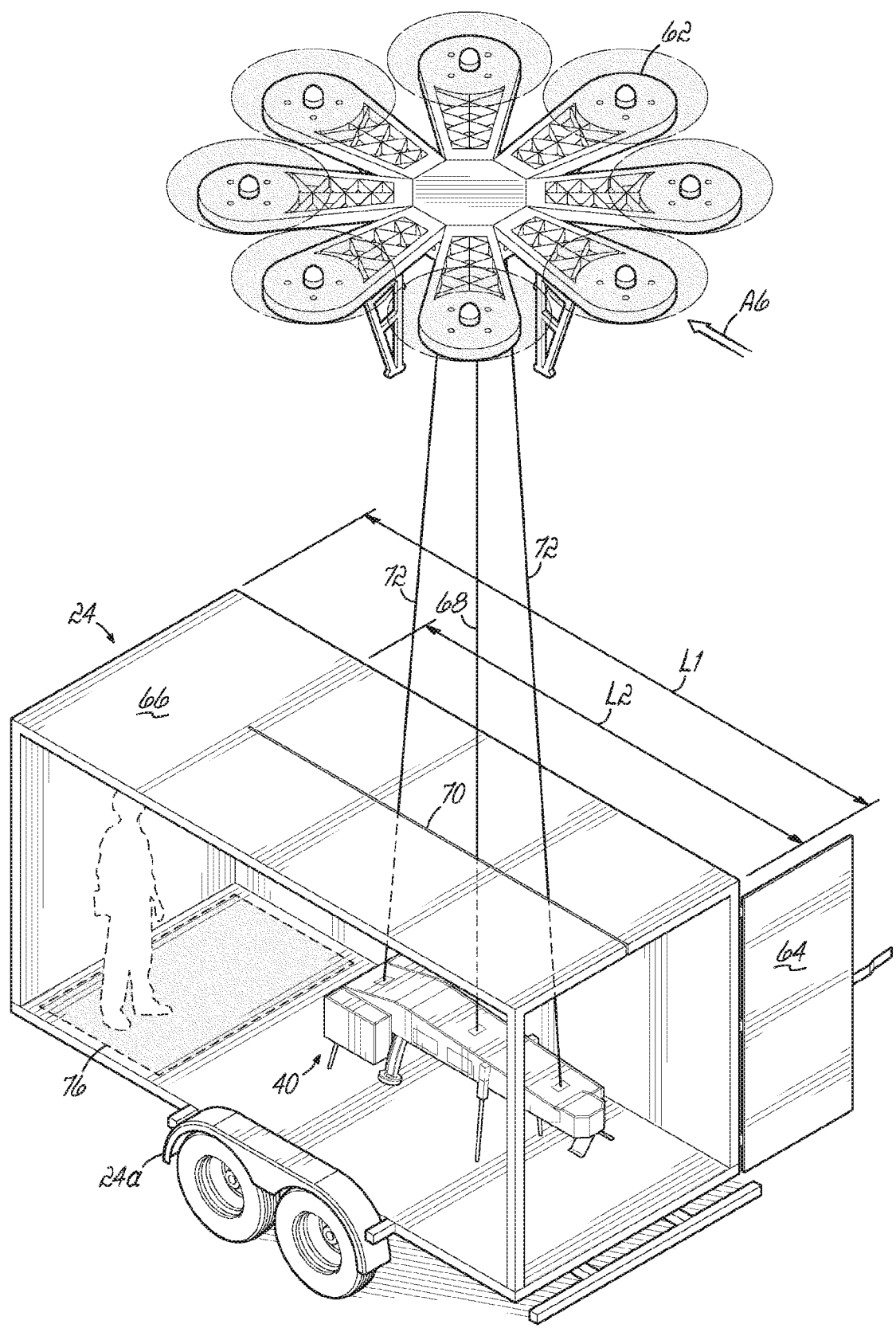
FIG. 14 is a perspective view similar to FIG. 13 and showing a subsequent operational state of the method, specifically in which the UAV is inserting the robotic maintenance device back into the transport container, this view also showing a safe location for an operator of the UAV to stand during this operational state.

Such a subsequent movement is shown nearly completed in FIG. 14. As the UAV 62 moves along the direction of arrow A6, any of the control lines 72 and the support line 68 that remain connected with the robotic maintenance device 40 will be slid into the elongated slot 70 in the roof 66 of container 24 and then guided through additional movements longitudinally into the container 24. Such insertion and guiding using the lines 68, 72 in the elongated slot 70 helps assure that the maintenance device 40 remains properly centered/positioned during movements back to the storage position. Once the maintenance device 40 has returned to the desired storage position, the UAV 62 lowers to remove the full loading tension on the support line 68 (and the control lines 72, when still connected), at which point the operator can remove the securing of the various lines 68, 72 and then park the UAV 62 for storage and/or disassembly.

FIG. 14 also shows an additional advantage of this arrangement and repair method, that being the definition/provision of a safe location 76 or zone within the container 24 for the operator to stand during all of the aforementioned movements of the maintenance device 40 into and out of the transport container 24 with the UAV 62. The safe location 76 is defined by a portion of the enclosed storage space that is longitudinally in front of the area within the container 24 that the maintenance device 40 can be moved to. This safe location 76 and the operator are shown in dashed line for clarity in FIG. 14. More specifically, the safe location 76 is defined as follows: the transport container 24 defines a longitudinal length L1, the elongated slot 70 defines a longitudinal length L2, and L1>L2 such that the portion where the elongated slot 70 does not extend to is where the safe location 76 is within the container 24. The operator can stand in this safe location 76 both during initial launching of the maintenance device 40 and during return after the repair actions, and the maintenance device is limited by the end of the elongated slot 70 from coming into contact with the operator when in this safe location 76 or zone. Likewise, the operator in this area is shielded from the UAV 62 as well.

Figure 15:
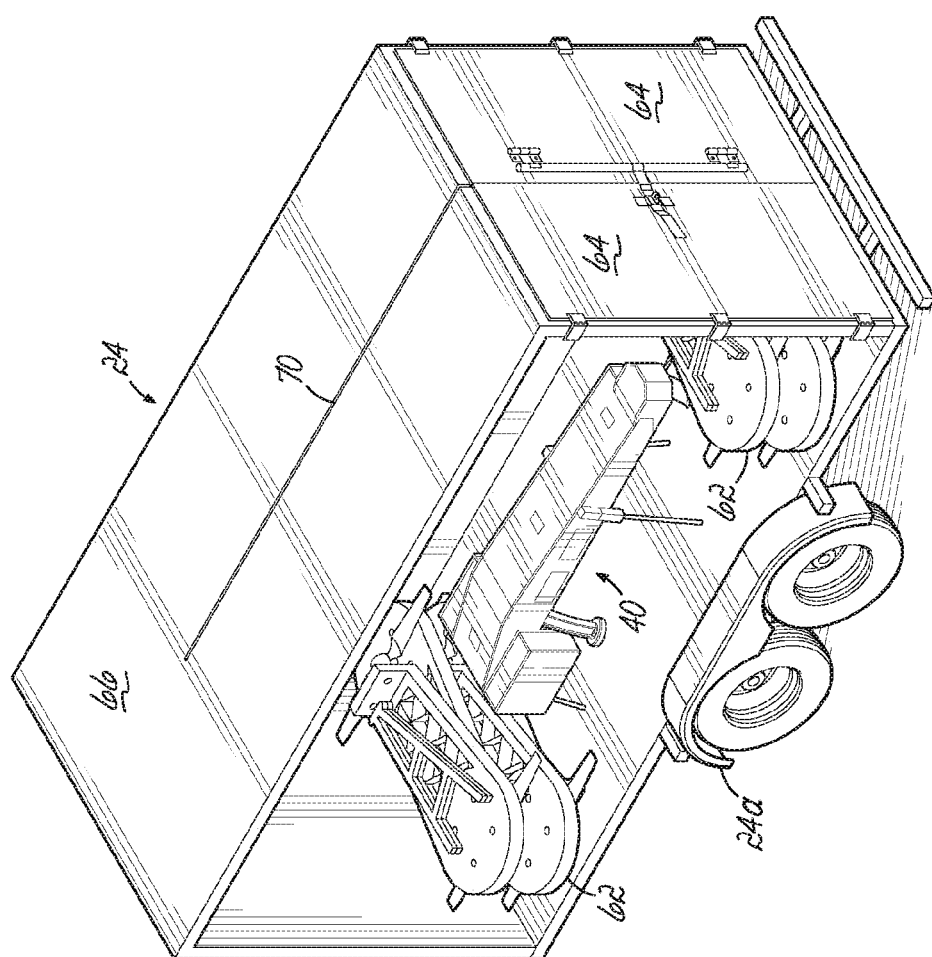
FIG. 15 is a perspective view similar to FIG. 14 and showing a subsequent operational state of the method, specifically in which the UAV and the robotic maintenance device have been placed back in the storage position for storage or movement to another site.

The repair method as set forth in this exemplary embodiment is then completed by returning the repair system and its elements back to the transport container 24 as shown in FIG. 15. For example, the UAV 62 can be disassembled after being parked on the ground surface so that the parts of the UAV 62 can be packed in the open spaces around the robotic maintenance device 40. The rear door 64 of the container 24 can then be closed and the repair system is ready for use on another wind turbine 10 or at another site. It will be appreciated that any batteries or other power supply for the UAV 62 would be recharged between such repair method implementations, and any coating materials and repair supplies could be replenished on the maintenance device 40 also. As described in detail herein, the repair method shown in these Figures and in alternative embodiments of this invention allow for a semi-automated repair of damages around the leading edge 22 of a wind turbine blade 20 while minimizing the total operational downtime and the manpower needed for such repairs and maintenance. This repair method and system completely avoids the need for rope access technicians and the associated higher costs and delays associated with same.

Figure 16:
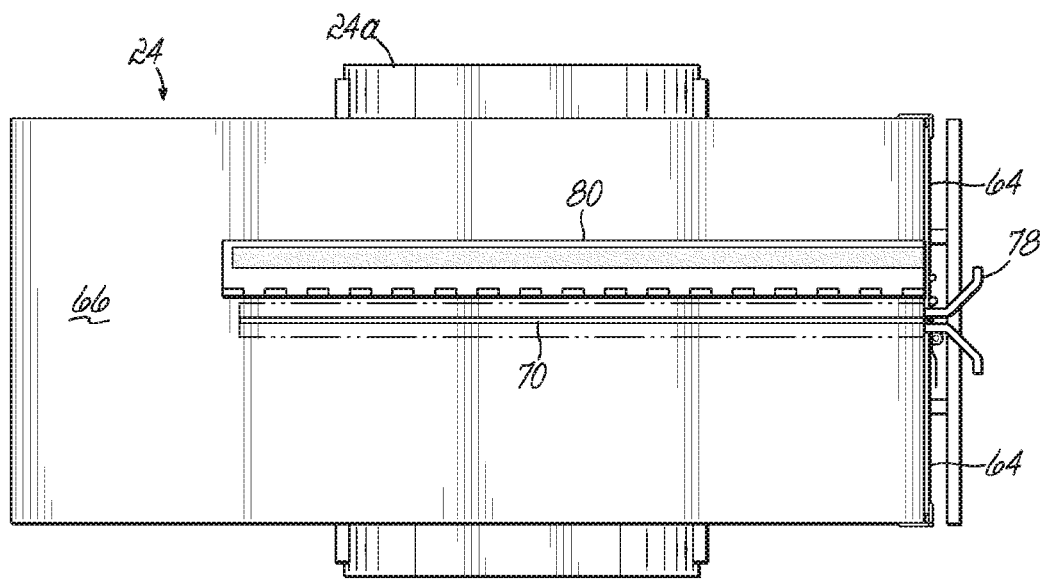
FIG. 16 is a top view of the transport container in accordance with one embodiment of the invention, showing further details of an elongated slot located in the roof of the transport container for guiding movements of the robotic maintenance device, the slot being shown with a closure mechanism in an open state.
Figure 17:
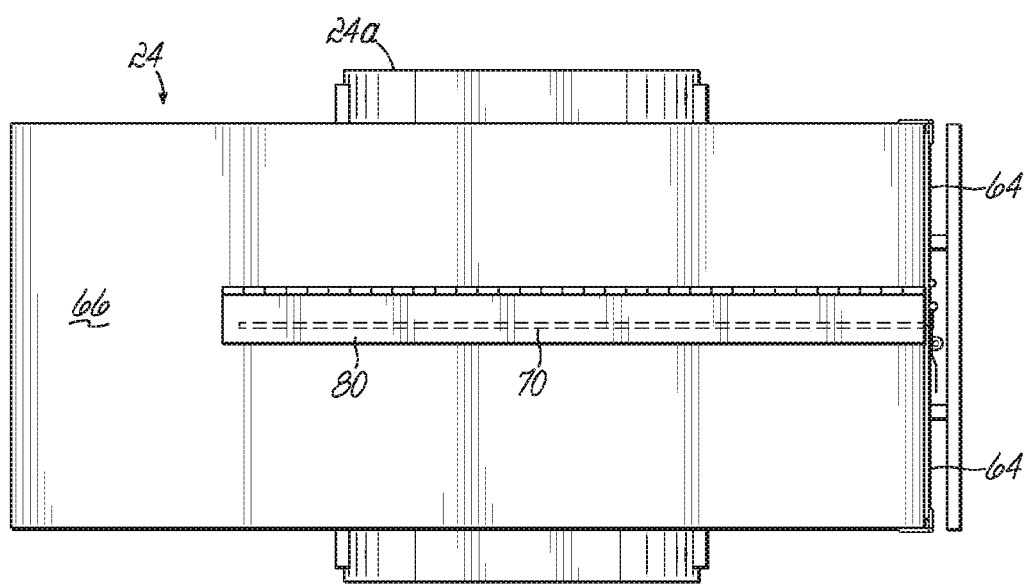
FIG. 17 is a top view of the transport container of FIG. 16, with the closure mechanism moved to a closed state.
Figure 18:
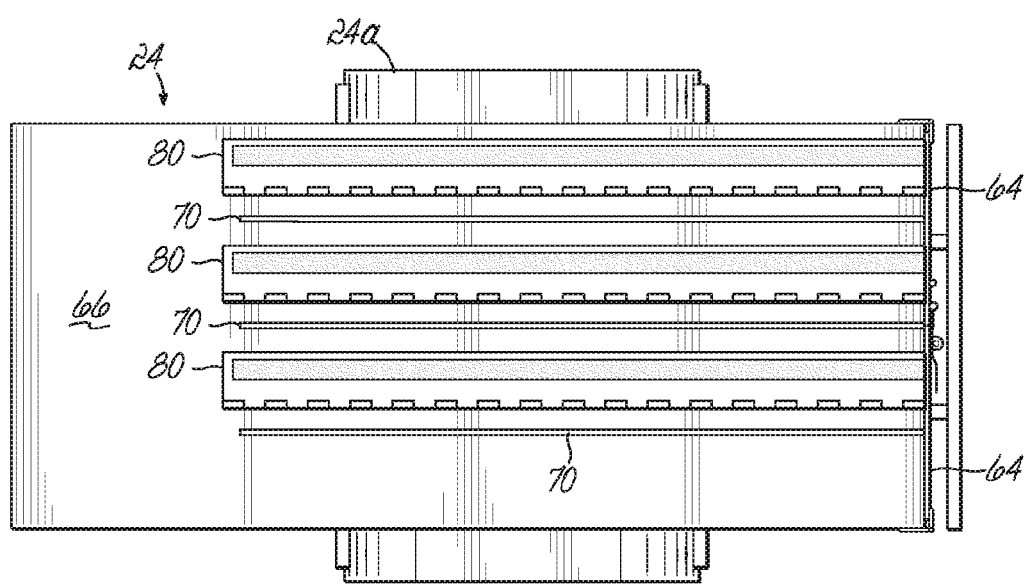
FIG. 18 is a top view of an alternative embodiment of a transport container, which is similar to the container of FIG. 16 but includes multiple elongated slots in the roof thereof.

Now with reference to FIGS. 16-18, further features of the transport container 24 that may be used with the repair system of this invention are shown in detail. Beginning with FIG. 16, the container 24 is shown in a top view looking down at the roof 66, and the details of the elongated slot 70 can be seen in further detail. In this regard, the transport container 24 may further include in some embodiments a funnel-shaped entry guide 78 that is secured to the end of the elongated slot 70 above the opening at the rear door 64. The entry guide 78 splays outwardly so that any of the control lines 72 and the support line 68 can be captured and guided into sliding engagement into the elongated slot 70 during movement of the maintenance device 40 back into the container 24 with the UAV 62. The entry guide 78 therefore helps correct for any minor lack of precision or accuracy during movement back to the storage position. The entry guide 78 may be modified to have different shapes and forms in other embodiments while remaining consistent with the scope of the invention, and this element is optional and can be omitted in other embodiments.

The elongated slot 70 of the embodiment shown in FIGS. 16 and 17 also includes a closure mechanism 80 such as the hinged closure door shown in these views. The closure mechanism 80 is moved to an open position as shown in FIG. 16 during the operations of the UAV 62 in the repair method, and then can be moved to the closed position shown in FIG. 17 to block the elongated slot 70 when the repair method is not being performed.

Such a closure of the elongated slot 70 closes off or seals the storage space within the container 24 from environmental conditions and/or from unauthorized personnel gaining access to the stored elements of the repair system between uses. It will be appreciated that the closure mechanism 80 may take other known forms for closing the elongated slot 70 without departing from the scope of the invention, e.g., the closure mechanism 80 could be a rollout extendible cover in other embodiments rather than a pivotal panel or door.

Another alternative embodiment of the container 24 is shown in FIG. 18. The difference in this embodiment is providing multiple elongated slots 70 in the roof 66 of the container 24. Such an arrangement may be preferred when the securing of the control lines 72 and the support line(s) 68 are provided on the UAV 62 in such a manner to want these various lines 68, 72 to be laterally spaced apart during movements of the maintenance device 40 into and out of the container 24. Each of the elongated slots 70 would typically receive at least one of the lines 68, 72 during UAV 62 movements similar to those described in detail above, in such an alternative embodiment. Moreover, although not shown in FIG. 18, additional options such as entry guides 78 (see FIG. 16) could be added for each of the multiple elongated slots 70.

Regardless of the particular form of the elongated slot(s) 70 provided, some additional details are now provided for this element. In one exemplary embodiment, the elongated slot 70 may define a transverse width of up to 0.5 meter, which is still sufficient to limit and guide movements of the maintenance device 40 into and out of the container 24. A larger width of the elongated slot 70 is shown in phantom lines in FIG. 16, as such an alternative example. For reference, the transport container 24 as shown in this illustrated embodiment is generally about 4.5 to 5 meters in longitudinal length and about 2 meters in height and lateral width. Thus, the elongate slot 70 is shown relatively small in these illustrations but could be much wider in actual appearance. That also explains the need in some embodiments for the closure mechanism 80 to be provided as well.

The repair system, which includes robotic maintenance device 40 and UAV 62, and the associated repair method described in these embodiments allows for a repair or maintenance action to be taken without requiring human operators or rope access technicians on the wind turbine blade 20 itself. The UAV-driven movements of the maintenance device 40 help minimize an operational downtime needed for the wind turbine 10 to receive the repairs, and the configurations using the transport container 24 provide reliability and safety for the movements to and from storage within the container 24. As a result, lesser categories of blade damage such as erosion damage 26 can be quickly repaired when using this device and method, which will lead turbine operators to perform such routine maintenance on a regular schedule that should mostly avoid damage build up over time that can cause significant operational downtime when blades 20 need to be removed or replaced for complex repair. As alluded to herein, the operator on the ground surface typically interacts with the repair system to help control and guide the maintenance and repair actions and assure these are done efficiently and with high quality, while also assuring proper operation of the UAV 62 during all steps. Thus, the repair system and method achieves several technical advantages and improves the maintenance field as it relates to wind turbines and wind energy generation.

While the present invention has been illustrated by a description of various preferred embodiments and while these embodiments have been described in some detail, it is not the intention of the Applicant to restrict or in any way limit the scope of the appended claims to such detail. Additional advantages and modifications will readily appear to those skilled in the art. Thus, the various features of the invention may be used alone or in any combination depending on the needs and preferences of the user.

The invention claimed is:

1. A method for repairing damage around a leading edge of a wind turbine blade on a wind turbine, the method including:
   operating the wind turbine to move one of the wind turbine blades to a generally horizontal orientation; and
   pitching the wind turbine blade in the generally horizontal orientation such that the leading edge of the blade is oriented to face vertically upward;
   the method characterized by:
   providing a robotic maintenance device and an unmanned aerial vehicle (UAV);
   securing the robotic maintenance device to the UAV with at least one support line extending therebetween;
   moving the robotic maintenance device with the UAV from a storage position to an operation position in which the robotic maintenance device is mounted on the wind turbine blade proximate the leading edge;
   performing repair actions with the robotic maintenance device as the robotic maintenance device moves along a length of the wind turbine blade, the UAV remaining connected with the robotic maintenance device by the at least one support line during the performing of repair actions; and moving the robotic maintenance device with the UAV off of the wind turbine blade following the repair actions and returning the robotic maintenance device back to the storage position.

2. The method of claim 1, wherein the step of performing repair actions with the robotic maintenance device is further characterized by:
optionally abrading an exterior surface of the wind turbine blade around the damage using a sander located on the robotic maintenance device, to thereby prepare the exterior surface for the repair actions; and
applying a coating material over the exterior surface of the wind turbine blade with the robotic maintenance device at a position proximate the leading edge, such that the coating material fills in and covers up any damage.

3. The method of claim 1, characterized in that at least one of the support lines is individually load-rated to support more than a full weight of the robotic maintenance device, such that any one of the support lines can carry the robotic maintenance device when lifted and moved by the UAV.

4. The method of claim 1, further characterized by:
extending the at least one support line after mounting the robotic maintenance device on the wind turbine blade, thereby to remove a full loading tension force on the at least one support line; and
hovering the UAV within a maximum range from the robotic maintenance device, the maximum range defined by a length of the at least one support line when same is extended to remove the full loading tension force, during performing of repair actions with the robotic maintenance device.

5. The method of claim 1, wherein the at least one support line secures the robotic maintenance device at a first spacing below the UAV during movement from the storage position to the operation position, and the method is further characterized by:
moving the UAV away from the robotic maintenance device to a second spacing larger than the first spacing before the robotic maintenance device performs repair actions on the wind turbine blade; and
after performing repair actions with the robotic maintenance device on the wind turbine blade, optionally retracting the at least one support line and moving the UAV towards the robotic maintenance device back to the first spacing before using the UAV to lift the robotic maintenance device off of the wind turbine blade.

6. The method of claim 1, wherein the at least one support line is secured to the robotic maintenance device in a central portion proximate a center of gravity of the robotic maintenance device, and the method is further characterized by:
further securing the UAV to a front end and a rear end of the robotic maintenance device using at least two control lines which are configured to control rotations of the robotic maintenance device about a vertical axis and prevent undesirable and uncontrolled rotations.

7. The method of claim 6, characterized in that the at least one support line remains connected between the UAV and the robotic maintenance device during performance of repair actions with the robotic maintenance device on the wind turbine blade, and the at least two control lines may optionally be disengaged prior to performance of repair actions.

8. The method of claim 1, further characterized by:
providing a transport container that contains the robotic maintenance device and the UAV during transport and before use at the wind turbine, characterized in that the storage position is within the transport container such that the UAV moves the robotic maintenance device into and out of the transport container when moving the robotic maintenance device between the operation position and the storage position.

9. The method of claim 8, further characterized by:
parking the UAV on top of the transport container during the securing of the robotic maintenance device to the UAV with the at least one support line.

10. The method of claim 8, characterized in that the transport container defines an enclosed storage space including a rear door opening at one longitudinal end thereof and a roof at a top end thereof, the roof includes at least one elongated slot extending longitudinally from the rear door opening, and the method is further characterized by:
guiding UAV-driven movement of the robotic maintenance device during insertion into and removal from the transport container by sliding the at least one support line along the at least one elongated slot, thereby preventing undesired rotational movements of the robotic maintenance device within the storage space.

11. The method of claim 10, characterized in that the transport container defines a longitudinal length L1, the at least one elongated slot defines a length L2, and L1>L2 such that at least a portion of space within the transport container does not receive the robotic maintenance device, thereby providing a safe location away from the robotic maintenance device for an operator controlling the UAV while standing within the transport container.

12. A method for repairing damage around a leading edge of a wind turbine blade on a wind turbine, the method including:
operating the wind turbine to move one of the wind turbine blades to a generally horizontal orientation; and pitching the wind turbine blade in the generally horizontal orientation such that the leading edge of the blade is oriented to face vertically upward;
the method characterized by:
providing a robotic maintenance device and an unmanned aerial vehicle (UAV);
securing the robotic maintenance device to the UAV with at least one support line extending therebetween;
moving the robotic maintenance device with the UAV from a storage position to an operation position in which the robotic maintenance device is mounted on the wind turbine blade proximate the leading edge;
performing repair actions with the robotic maintenance device as the robotic maintenance device moves along a length of the wind turbine blade, the UAV remaining connected with the robotic maintenance device by the at least one support line during the performing of repair actions; and
moving the robotic maintenance device with the UAV off of the wind turbine blade following the repair actions and returning the robotic maintenance device back to the storage position,
the method further characterized by:
mounting a power supply for the UAV on the robotic maintenance device; and
transmitting operating power, using a cable associated with the at least one support line, from the power supply on the robotic maintenance device to the UAV whenever the UAV is secured to the robotic maintenance device, thereby reducing a total load to be carried by the UAV when the robotic maintenance device is mounted on the wind turbine blade.

13. A repair system for repairing damage around a leading edge of a wind turbine blade on a wind turbine, the system characterized by:
- a robotic maintenance device configured to move along a longitudinal length of the wind turbine blade, to optionally abrade an exterior surface of the wind turbine blade around the damage with a sander, and to apply a coating material over the exterior surface of the wind turbine blade to perform repair actions by filling in and covering up any damage around the leading edge of the wind turbine blade; and
- an unmanned aerial vehicle (UAV) including at least one support line that is removably secured to the robotic maintenance device to allow the UAV to move the robotic maintenance device, and also including at least two control lines that are secured to different portions of the robotic maintenance device to control rotations of the robotic maintenance device about a vertical axis when moving the robotic maintenance device between a storage position and an operation position mounted on the wind turbine blade,
- the system further characterized by:
  - a power supply for the UAV, the power supply being mounted on the robotic maintenance device; and
  - a cable associated with the at least one support line, the cable configured to transmit operating power from the power supply on the robotic maintenance device to the UAV whenever the UAV is secured to the robotic maintenance device, thereby reducing a total load to be carried by the UAV when the robotic maintenance device is mounted on the wind turbine blade.

14. The repair system of claim 13, further characterized by:
- a transport container sized to contain the robotic maintenance device and the UAV during transport and delivery to the wind turbine, and characterized in that the storage position is within the transport container.

15. The repair system of claim 13, characterized in that the at least one support line is secured to the robotic maintenance device in a central portion proximate a center of gravity of the robotic maintenance device, and the at least two control lines are secured to a front end and a rear end of the robotic maintenance device on opposite sides of the central portion.

16. The repair system of claim 13, characterized in that:
- the at least two control lines are optionally disengaged from the robotic maintenance device prior to performance of repair actions; and
- the at least one support line is extendible between securements with the UAV and with the robotic maintenance device, such that the UAV can move between a first spacing above the robotic maintenance device during movement between the storage position and the operation position, to a second spacing larger than the first spacing during performance of repair actions at the wind turbine blade.

17. The repair system of claim 13, characterized in that at least one of the support lines is individually load-rated to support more than a full weight of the robotic maintenance device, such that any one of the support lines can carry the robotic maintenance device when lifted and moved by the UAV.

18. A repair system for repairing damage around a leading edge of a wind turbine blade on a wind turbine, the system characterized by:
- a robotic maintenance device configured to move along a longitudinal length of the wind turbine blade, to optionally abrade an exterior surface of the wind turbine blade around the damage with a sander, and to apply a coating material over the exterior surface of the wind turbine blade to perform repair actions by filling in and covering up any damage around the leading edge of the wind turbine blade;
- an unmanned aerial vehicle (UAV) including at least one support line that is removably secured to the robotic maintenance device to allow the UAV to move the robotic maintenance device, and also including at least two control lines that are secured to different portions of the robotic maintenance device to control rotations of the robotic maintenance device about a vertical axis when moving the robotic maintenance device between a storage position and an operation position mounted on the wind turbine blade,
- a transport container sized to contain the robotic maintenance device and the UAV during transport and delivery to the wind turbine, and characterized in that the storage position is within the transport container,
- wherein the transport container is further characterized by:
  - an enclosed storage space including a rear door opening at one longitudinal end thereof and a roof at a top end thereof; and
  - at least one elongated slot in the roof which extends longitudinally from the rear door opening, the at least one elongated slot sized to receive the at least one support line and/or the at least two control lines such that UAV-driven movement of the robotic maintenance device is guided during movement into and from the transport container,
- characterized in that the transport container defines a longitudinal length L1, the at least one elongated slot defines a length L2, and L1>L2 such that at least a portion of space within the transport container does not receive the robotic maintenance device, thereby providing a safe location away from the robotic maintenance device for an operator controlling the UAV while standing within the transport container.

* * * * *